(12) United States Patent
Thomas

(10) Patent No.: US 8,732,073 B2
(45) Date of Patent: May 20, 2014

(54) PAY YOURSELF FIRST WITH REVENUE GENERATION

(75) Inventor: Tracey R. Thomas, Boonton, NJ (US)

(73) Assignee: Propulsion Remote Holdings, LLC, Dover, DE (US)

( * ) Notice: Subject to any disclaimer, the term of this patent is extended or adjusted under 35 U.S.C. 154(b) by 89 days.

(21) Appl. No.: 12/852,074

(22) Filed: Aug. 6, 2010

(65) Prior Publication Data

US 2011/0004546 A1   Jan. 6, 2011

Related U.S. Application Data

(63) Continuation of application No. 12/851,470, filed on Aug. 5, 2010, which is a continuation-in-part of application No. 12/756,346, filed on Apr. 8, 2010, which is a continuation-in-part of application No. 12/710,566, filed on Feb. 23, 2010, which is a continuation-in-part of application No. 10/710,779, filed on Aug. 2, 2004, now Pat. No. 8,473,380, which is a continuation-in-part of application No. 10/010,947, filed on Nov. 6, 2001, now Pat. No. 7,398,226, which is a continuation-in-part of application No. 09/836,213, filed on Apr. 17, 2001, now Pat. No. 7,398,225.

(60) Provisional application No. 60/279,817, filed on Mar. 29, 2001, provisional application No. 60/246,208, filed on Nov. 6, 2000, provisional application No. 60/542,716, filed on Feb. 6, 2004, provisional application No. 60/552,857, filed on Mar. 11, 2004.

(51) Int. Cl.
 *G06Q 40/00* (2012.01)

(52) U.S. Cl.
 USPC .............................. 705/38; 705/35; 705/36 R

(58) Field of Classification Search
 USPC ...................................................... 705/35, 38
 See application file for complete search history.

(56) References Cited

U.S. PATENT DOCUMENTS 4,400,017 A * 8/1983 Pendergrass .................. 283/66.2
5,093,787 A * 3/1992 Simmons ......................... 705/33
(Continued)

FOREIGN PATENT DOCUMENTS

EP  0 308 224 A2  3/1989
JP  8-235276 A    9/1996
(Continued)

OTHER PUBLICATIONS

Chevreau, Jonathan, "Pay Yourself First Still Works" National Post Jan. 29, 2004.
(Continued)

*Primary Examiner* — Kirsten Apple

(57) ABSTRACT

The system identifies a revenue producing opportunity for a user. The system obtains information related to the user's income, income sources, user's debts (e.g., bills) and user's goals. The system identifies a revenue producing opportunity for the user by matching user information with information regarding the opportunities. The system further provides recommendations related to the prioritization of paying certain bills and the amount to pay for each bill based upon, for example, savings goals, a community recommendation, minimizing penalties/fees associated with user's debts, minimum amounts due, due dates and available income. The system and/or the user may then determine a payment hierarchy which includes transferring funds to the user's savings account prior to paying all or a portion of certain bills, wherein the transfer of funds may include different funds transfer systems and methods.

18 Claims, 16 Drawing Sheets

(56) References Cited

U.S. PATENT DOCUMENTS

| | | | |
|---|---|---|---|
| 5,214,579 A | 5/1993 | Wolfberg et al. | |
| 5,319,542 A | 6/1994 | King et al. | |
| 5,630,073 A * | 5/1997 | Nolan | 705/45 |
| 5,659,165 A | 8/1997 | Jennings et al. | |
| 5,684,965 A * | 11/1997 | Pickering | 705/34 |
| 5,716,211 A | 2/1998 | Vetter | |
| 5,745,706 A | 4/1998 | Wolfberg et al. | |
| 5,875,437 A | 2/1999 | Atkins | |
| 5,878,405 A | 3/1999 | Grant et al. | |
| 5,914,472 A | 6/1999 | Foladare et al. | |
| 5,920,848 A | 7/1999 | Schutzer et al. | |
| 5,953,710 A | 9/1999 | Fleming | |
| 6,010,239 A | 1/2000 | Hardgrave et al. | |
| 6,012,048 A * | 1/2000 | Gustin et al. | 705/39 |
| 6,070,153 A * | 5/2000 | Simpson | 705/36 R |
| 6,073,840 A | 6/2000 | Marion | |
| 6,088,686 A * | 7/2000 | Walker et al. | 705/38 |
| 6,128,603 A * | 10/2000 | Dent et al. | 705/40 |
| 6,164,533 A * | 12/2000 | Barton | 235/380 |
| 6,298,334 B1 | 10/2001 | Burfield et al. | |
| 6,314,517 B1 | 11/2001 | Moses et al. | |
| 6,324,353 B1 * | 11/2001 | Laussermair et al. | 399/16 |
| 6,347,305 B1 | 2/2002 | Watkins | |
| 6,401,079 B1 | 6/2002 | Kahn et al. | |
| 6,594,640 B1 | 7/2003 | Postrel | |
| 6,601,761 B1 | 8/2003 | Katis | |
| 6,629,081 B1 | 9/2003 | Cornelius et al. | |
| 6,820,061 B2 | 11/2004 | Postrel | |
| 6,829,586 B2 | 12/2004 | Postrel | |
| 6,839,687 B1 | 1/2005 | Dent et al. | |
| 6,842,739 B2 | 1/2005 | Postrel | |
| 6,890,179 B2 | 5/2005 | Rogan et al. | |
| 6,907,403 B1 | 6/2005 | Klein et al. | |
| 6,947,898 B2 | 9/2005 | Postrel | |
| 6,965,868 B1 | 11/2005 | Bednarek | |
| 6,972,854 B1 | 12/2005 | Jung | |
| 6,980,968 B1 | 12/2005 | Walker et al. | |
| 6,985,867 B1 | 1/2006 | Pryor et al. | |
| 7,089,208 B1 | 8/2006 | Levchin et al. | |
| 7,236,950 B2 | 6/2007 | Savage et al. | |
| 7,313,543 B1 * | 12/2007 | Crane et al. | 705/39 |
| 7,398,225 B2 | 7/2008 | Voltmer et al. | |
| 7,398,226 B2 | 7/2008 | Haines et al. | |
| 2001/0011240 A1 | 8/2001 | Wardin et al. | |
| 2001/0039508 A1 | 11/2001 | Nagler et al. | |
| 2002/0023055 A1 * | 2/2002 | Antognini et al. | 705/40 |
| 2002/0026394 A1 | 2/2002 | Savage et al. | |
| 2002/0026423 A1 | 2/2002 | Maritzen et al. | |
| 2002/0026426 A1 | 2/2002 | Martizen et al. | |
| 2002/0116266 A1 | 8/2002 | Marshall | |
| 2002/0123949 A1 | 9/2002 | VanLeeuwen | |
| 2002/0156710 A1 | 10/2002 | Ryder | |
| 2003/0018557 A1 | 1/2003 | Gilbert et al. | |
| 2003/0023549 A1 | 1/2003 | Armes et al. | |
| 2003/0050831 A1 | 3/2003 | Klayh | |
| 2003/0105689 A1 | 6/2003 | Chandak et al. | |
| 2003/0144938 A1 | 7/2003 | Lahre et al. | |
| 2003/0188557 A1 | 10/2003 | Jennings et al. | |
| 2003/0216960 A1 | 11/2003 | Postrel | |
| 2003/0216996 A1 | 11/2003 | Cummings et al. | |
| 2003/0225642 A1 * | 12/2003 | Baker et al. | 705/35 |
| 2003/0225689 A1 | 12/2003 | MacFarlane et al. | |
| 2004/0097287 A1 | 5/2004 | Postrel | |
| 2004/0111367 A1 | 6/2004 | Gallagher et al. | |
| 2004/0111370 A1 | 6/2004 | Saylors et al. | |
| 2004/0143524 A1 | 7/2004 | Hilton | |
| 2004/0193491 A1 | 9/2004 | Davis | |
| 2004/0220854 A1 | 11/2004 | Postrel | |
| 2004/0254835 A1 | 12/2004 | Thomas et al. | |
| 2005/0004856 A1 | 1/2005 | Brose et al. | |
| 2005/0021399 A1 | 1/2005 | Postrel | |
| 2005/0021400 A1 | 1/2005 | Postrel | |
| 2005/0021401 A1 | 1/2005 | Postrel | |
| 2005/0044042 A1 | 2/2005 | Mendiola et al. | |
| 2005/0077348 A1 | 4/2005 | Hendrick | |
| 2005/0080727 A1 | 4/2005 | Postrel | |
| 2005/0097034 A1 | 5/2005 | Loeger et al. | |
| 2005/0102209 A1 | 5/2005 | Sagrillo et al. | |
| 2005/0149394 A1 | 7/2005 | Postrel | |
| 2005/0149436 A1 | 7/2005 | Elterich | |
| 2005/0177500 A1 | 8/2005 | Thomas et al. | |
| 2005/0177503 A1 | 8/2005 | Thomas | |
| 2005/0228733 A1 | 10/2005 | Bent et al. | |
| 2005/0240472 A1 | 10/2005 | Postrel | |
| 2005/0283435 A1 | 12/2005 | Mobed et al. | |
| 2006/0020511 A1 | 1/2006 | Postrel | |
| 2006/0190372 A1 | 8/2006 | Chhabra et al. | |
| 2006/0200396 A1 | 9/2006 | Satterfield et al. | |
| 2006/0212389 A2 | 9/2006 | Bent et al. | |
| 2007/0118476 A1 | 5/2007 | Likourezos et al. | |
| 2007/0162387 A1 | 7/2007 | Cataline et al. | |
| 2007/0174163 A1 | 7/2007 | Griffin et al. | |
| 2008/0005021 A1 | 1/2008 | Brown et al. | |
| 2009/0172035 A1 | 7/2009 | Lessing et al. | |
| 2009/0298514 A1 | 12/2009 | Ullah | |
| 2010/0153200 A1 | 6/2010 | Thomas | |
| 2010/0161465 A1 * | 6/2010 | McMaster | 705/34 |
| 2010/0198724 A1 | 8/2010 | Thomas | |
| 2010/0241559 A1 * | 9/2010 | O'Connor et al. | 705/39 |
| 2011/0078073 A1 * | 3/2011 | Annappindi | 705/38 |

FOREIGN PATENT DOCUMENTS

| | | |
|---|---|---|
| JP | 2003-132224 A | 5/2003 |
| WO | 99/30261 | 6/1999 |
| WO | 01/39077 | 5/2001 |
| WO | 0139077 | 5/2001 |
| WO | 02/097561 | 12/2002 |

OTHER PUBLICATIONS

Chevreau, Jonathan, National Post dated Jan. 29, 2004, titled 'Pay Yourself First' Still Works.
Non-Final Rejection mailed Nov. 5, 2007 in U.S. Appl. No. 10/709,707.
Non-Final Rejection mailed Dec. 17, 2007 in U.S. Appl. No. 10/709,706.
Non-Final Rejection mailed Feb. 6, 2008 in U.S. Appl. No. 10/709,702.
Final Rejection mailed Apr. 24, 2008 in U.S. Appl. No. 10/709,707.
Final Rejection mailed May 1, 2008 in U.S. Appl. No. 10/709,706.
Non-Final Rejection mailed Nov. 12, 2008 in U.S. Appl. No. 10/709,702.
Non-Final Rejection mailed Jan. 5, 2009 in U.S. Appl. No. 10/709,706.
Non-Final Rejection mailed Jan. 26, 2009 in U.S. Appl. No. 10/709,707.
Final Rejection mailed Aug. 4, 2009 in U.S. Appl. No. 10/709,702.
Non-Final Rejection mailed Sep. 24, 2009 in U.S. Appl. No.10/709,701.
Non-Final Rejection mailed Sep. 30, 2009 in U.S. Appl. No. 10/709,703.
Final Rejection mailed Oct. 1, 2009 in U.S. Appl. No. 10/709,706.
Final Rejection mailed Nov. 24, 2009 in U.S. Appl. No. 10/709,707.
Advisory Action mailed Feb. 9, 2010 in U.S. Appl. No. 10/709,707.
Advisory Action mailed Feb. 19, 2010 in U.S. Appl. No. 10/709,706.
Advisory Action mailed Feb. 24, 2010 in U.S. Appl. No. 10/709,703.
Non-Final Office Action from U.S. Appl. No. 10/710,779 dated Apr. 26, 2010.
Quayle Action from U.S. Appl. No. 10/709,702 dated May 12, 2010.
Notice of Allowance dated May 14, 2010 for U.S. Appl. No. 10/709,701.
Notice of Allowance dated Jul. 22, 2010 for U.S. Appl. No. 10/709,703.
Notice of Allowance mailed Jul. 22, 2010 in U.S. Appl. No. 10/709,703.
Final Rejection mailed Sep. 27, 2010 in U.S. Appl. No. 10/710,779.
Notice of Allowance mailed Oct. 1, 2010 in U.S. Appl. No. 10/709,702.

(56) References Cited

OTHER PUBLICATIONS

Non-Final Rejection for U.S. Appl. No. 10/709,706 mailed Nov. 9, 2010.
Non-Final Rejection for U.S. Appl. No. 10/710,779 mailed Dec. 13, 2010.
Final Rejection mailed Apr. 20, 2011 in U.S. Appl. No. 10/709,706.
International Search Report and Written Opinion for International Application No. PCT/US11/25360 dated Apr. 25, 2011.
USPTO; Office Action dated Sep. 18, 2007 in U.S. Appl. No. 10/709,703.
USPTO; Final Office Action dated May 2, 2008 in U.S. Appl. No. 10/709,703.
USPTO; Office Action dated Jan. 8, 2009 in U.S. Appl. No. 10/709,703.
USPTO; Notice of Allowance dated Aug. 12, 2010 in U.S. Appl. No. 10/709,703.
USPTO; Office Action dated Apr. 25, 2008 in U.S. Appl. No. 10/709,701.
USPTO; Final Office Action dated Jan. 12, 2009 in U.S. Appl. No. 10/709,701.
USPTO; Advisory Action dated Jul. 7, 2011 in U.S. Appl. No. 10/709,706.
USPTO; Office Action dated May 25, 2011 in U.S. Appl. No. 10/709,707.
USPTO; Advisory Action dated Oct. 26, 2010 in U.S. Appl. No. 10/710,779.
USPTO; Final Office Action dated May 19, 2011 in U.S. Appl. No. 10/710,779.
USPTO; Advisory Action dated Jul. 26, 2011 in U.S. Appl. No. 10/710,779.
Citrome, Michael, "A personal budget is your key to financial control," The Gazette, Jul. 21, 2003, pp. 1-2.
Anonymous, "How to Handle Debt," by Scottish Debtline, Scotland on Sunday, Dec. 2001, pp. 1-2.
Chen, Steven, "Monthly Personal Budget Planner," Family and Home Office Computing, Aug. 1988, pp. 1-4.
Non-Final Rejection mailed Feb. 27, 2009 in U.S. Appl. No. 10/710,779.
Final Rejection mailed Nov. 3, 2009 in U.S. Appl. No. 10/710,779.
Advisory Action mailed Feb. 22, 2010 in U.S. Appl. No. 10/710,779.
USPTO; Final Office Action dated Oct. 26, 2011 in U.S. Appl. No. 10/709,707.
USPTO; Office Action dated Oct. 14, 2011 in U.S. Appl. No. 10/709,706.
USPTO; Office Action dated Nov. 17, 2011 in U.S. Appl. No. 12/756,346.
USPTO; Office Action dated Oct. 7, 2011 in U.S. Appl. No. 12/852,122.
Chris Reidy, "Brick and Mortar Stores lure Customers in Cyberspace" Boston Globe Apr. 3, 2000 p. 1-2.
Claudia Miller, "Piggy Bank 101 /It pays to teach kids money handling early" San Francisco Chronicle Dec. 29, 2000 p. 1-2.
Sharon Linstedt "And you thought layaway was dead even people with great credit use layaway to save credit card interest charges" Buffalo News, Nov. 7, 2000, pp. 1-2.
USPTO; Office Action dated Oct. 18, 2011 in U.S. Appl. No. 10/710,779.
USPTO; Office Action dated Nov. 8, 2011 in Serial No. 12/714,772.
USPTO; Office Action dated Oct. 12, 2011 in U.S. Appl. No. 12/710,566.
David Bach, "The Automatic Millionaire: A Powerful One-Step Plan to Live and Finish Rich," Broadway Books/Random House, available Dec. 30, 2003, pp. 18-21, 24-25, 62-69, 202-207.
Office Action in U.S. Appl. No. 12/852,272 issued Feb. 15, 2012, 16 pages.
Final Action in U.S. Appl. No. 12/852,122 issued Feb. 29, 2012, 14 pages.
Final Action in U.S. Appl. No. 12/852,224 issued Mar. 9, 2012, 14 pages.
Response to Final Action in U.S. Appl. No. 12/852,224 issued Mar. 9, 2012, mailed Jun. 11, 2012 , 9 pages.
Office Action in U.S. Appl. No. 12/852,141 issued Mar. 8, 2012, 13 pages.
Response to Office Action in U.S. Appl. No. 12/852,141 issued Mar. 8, 2012, mailed Jun. 8, 2012, 9 pages.
Response to Office Action in U.S. Appl. No. 12/852,272 issued Feb. 15, 2012, mailed Jun. 14, 2012, 10 pages.
Response to Office Action in U.S. Appl. No. 12/852,122 issued Feb. 29, 2012, mailed Jun. 29, 2012, 10 pages.

\* cited by examiner

PAY YOURSELF FIRST WITH REVENUE GENERATION

CROSS REFERENCE TO RELATED APPLICATIONS

This application is a continuation of, and claims the benefit of, U.S. application Ser. No. 12/851,470 entitled "Pay Yourself First with Revenue Generation" filed Aug. 5, 2010. The '470 application claims priority to U.S. application Ser. No. 12/756,346 entitled "Pay Yourself First With Community Knowledge" filed Apr. 8, 2010. The '346 application itself claims priority to U.S. application Ser. No. 12/710,566 entitled "Pay Yourself First With Automated Data Input" filed Feb. 23, 2010. The '566 application itself claims priority to U.S. application Ser. No. 10/710,779 entitled "Pay Yourself First Budgeting" filed Aug. 2, 2004. The '779 application is a continuation-in-part of U.S. application Ser. No. 10/010,947 filed on Nov. 6, 2001 entitled "System And Method For Networked Loyalty Program". The '947 application claims priority to U.S. application Ser. No. 09/836,213, filed Apr. 17, 2001 and entitled "System and Method for Networked Loyalty Program". The '213 application claims priority to, and the benefit of, U.S. Provisional Application No. 60/279,817, filed Mar. 29, 2001 and entitled "System and Method for Networked Incentive Awards Program", and U.S. Provisional Application No. 60/246,208, filed Nov. 6, 2000 and entitled "Virtually Complete Purchasing". The '779 also claims priority to, and the benefit of, U.S. Provisional Application No. 60/542,716, entitled "Pay Yourself First System And Method" filed Feb. 6, 2004 and U.S. Provisional Application No. 60/552,857, entitled "Improved Pay Yourself First System And Method", filed Mar. 11, 2004. All of such applications are hereby incorporated by reference in their entirety.

FIELD OF INVENTION

This invention relates generally to money management, and more particularly, to the hierarchical distribution of income among a user's savings account and a user's debts, wherein the distribution may include various forms of transferring funds.

BACKGROUND OF THE INVENTION

An increasing number of people have difficulty managing their income and debts as evidenced by an increase in bankruptcies, home foreclosures, excessive credit card balances, and other money mismanagement practices. Additionally, a larger number of people tend to live paycheck to paycheck, and unfortunately, an increasing number of consumer services take advantage of consumer's money mismanagement practices. For example, an increased number of financial products and services exist which put people in larger debt or require people to pay more bills including, for example, check cashing centers with large fees, home equity loans, interest free or payment free purchases for a certain number of months, cash advance offers, pawn shops, short-term cash loans with large interest rates, debt consolidation loans and early partial monies based upon the user assigning tax rebates.

Furthermore, due in part to the increased use of charge cards, payment plans, layaway plans, periodic payment plans, loans, mortgages and other services which are billed periodically, people are typically forced to manage numerous bills and other debts each month. Upon receiving a bill, many people pay the bill immediately or as soon as possible to avoid missing a payment and to avoid any late fees. Many people also usually pay bills immediately upon receipt in fear that their credit rating may be affected, fear that they may be sued, fear of late fees, discontinuance of service, a dislike of owing money, and/or a dislike of unresolved bills piled up in their homes. Moreover, many people will often use all of their income to pay bills first, spend all of their discretionary money, then attempt to save the remainder of the income, which is often little or no money. As such, many people are unable to save a sufficient amount of money. Accordingly, a system is needed to encourage and increase savings prior to paying all or a portion of debts, while reducing such bill payment fears and at least partially discouraging the attitude to pay the entire amount of bills or debts first.

Moreover, while automatic bill payment systems exist, the automatic bill payment systems typically require consumer input of a particular amount to be paid and a particular bill to be paid. However, the automatic bill payment systems do not include any hardware or software to consider user income, user income sources and user savings goals when determining bill payments. Additionally, because third party companies operate the automatic bill payment systems, the automatic bill payment systems cannot be sufficiently customized or altered to provide such features. Accordingly, a technical problem exists wherein the automatic bill payment systems lack certain needed features. As such, a need exists to develop complex hardware and software to analyze income sources and savings goals before transferring the consumer funds to an automatic bill payment system.

Incentive award programs have been developed in a variety of industries to promote customer loyalty. Generally, such programs reward customers for repeat business with the same merchant or service provider by accumulating reward points which can then be redeemed in a plurality of ways, including exchanging the reward points for additional goods and services that may be selected from an approved list or a redemption catalog, for example. The reward points are usually calculated using a predetermined formula or ratio that relates a customer's purchase volume (i.e., in terms of money value or some other volume parameter) to a certain number of reward points. For example, reward points may be issued on a one-for-one basis with each dollar that a customer spends on particular goods and services.

One well-known example of a customer incentive program is a "frequent flyer" program which rewards airlines passengers with "mileage points" based upon the distances that the passengers fly with a particular airline. The mileage points may then be redeemed for free airfare or free car rentals. Other incentive award programs are designed to induce usage of particular financial instruments, such as credit cards or debit cards, by accumulating reward points or dollar value points based upon the volume of purchases made using the particular financial instrument. These types of programs may be designed such that customers of the financial institution accumulate reward points which can be redeemed for selected goods or services or, alternatively, such that customers accumulate points which have a dollar value which can be applied toward a credit or debit balance, depending on whether the instrument is a credit or debit instrument, for example.

These and other similar incentive award programs are described in U.S. Pat. Nos. 5,774,870 and 6,009,412, issued to Thomas W. Storey and assigned to Netcentives, Inc., both of which are hereby incorporated by reference to the extent that they describe an automated rewards system. For more information on loyalty systems, transaction systems, electronic commerce systems, and digital wallet systems, see, for example: the Shop AMEX™ system as disclosed in Ser. No.

60/230,190 filed Sep. 5, 2000; the MR as Currency™ and Loyalty Rewards Systems as disclosed in Ser. No. 60/197,296 filed on Apr. 14, 2000, Ser. No. 60/200,492 filed Apr. 28, 2000, and Ser. No. 60/201,114 filed May 2, 2000; a digital wallet system as disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers as disclosed in Ser. No. 09/800,461 filed on Mar. 7, 2001; and also in related provisional applications Ser. No. 60/187,620 filed Mar. 7, 2000, Ser. No. 60/200,625 filed Apr. 28, 2000, and Ser. No. 60/213,323 filed May 22, 2000; all of which are herein incorporated by reference. Other examples of online membership reward systems are disclosed in U.S. Pat. No. 5,774,870, issued on Jun. 30, 1998, and U.S. Pat. No. 6,009,412, issued on Dec. 29, 1999, both of which are hereby incorporated by reference. A further example of a loyalty and reward program may be found at the AIR MILES® Web site (www.airmiles.ca), which describes a loyalty program offered by The Loyalty Group, a privately held division of Alliance Data Systems of Dallas, Tex., and which is hereby incorporated by reference. Additional information relating to smart card and smart card reader payment technology is disclosed in Ser. No. 60/232,040, filed on Sep. 12, 2000, and U.S. Pat. Nos. 5,742, 845, 5,898,838 and 5,905,908, owned by Datascape; all of which are hereby incorporated by reference. Information on point-of-sale systems and the exploitation of point-of-sale data is disclosed in U.S. Pat. No. 5,832,457, issued on Nov. 3, 1998 to O'Brien et al., which is hereby incorporated by reference.

Portions of each of the above-described programs may be used to induce customer loyalty to particular merchants or service providers who directly provide goods or services to the consumer. In other words, these prior art frequency awards programs provide a means for retail businesses, financial institutions, and others in direct contact with the customers they service to provide incentives to their customers to encourage repeat and/or volume business. However, these programs do not sufficiently address the similar needs of businesses that are further up in the distribution chain, such as manufacturers, to promote volume purchases by customers based upon, for example, brand loyalty independent of the retail source for the purchase. Additionally, the prior art programs do not provide a means for monitoring, tracking, and/or analyzing consumer and product data across distribution channels for a particular manufacturer and/or the variety of goods which that manufacturer places into the stream of commerce for ultimate sale to consumers by a retailer.

Generally, before a product arrives at a retail establishment for sale to a consumer, the product travels through a distribution chain which originates with the manufacturer. The manufacturer typically sells its products to a wholesaler who in turn sells those products to various retailers. Most modern retailers implement some form of computerization or electronic technology in their day-to-day operations. This technology typically consists of using point-of-sale (POS) systems for automating checkout procedures, assisting sales personnel, and the like. POS systems generally include one or more automated check-out terminals which are capable of inputting or sensing and interpreting a symbol or other indicia related to the product, such as a Universal Product Code (UPC), generally comprising a machine-readable bar code coupled with a human-readable UPC number, that is printed on a label or tag which is placed on each item of merchandise to be purchased. The manufacturer may assign and mark each product that it sells with a UPC. Conventionally, once the product reaches the retailer, the retailer further identifies each product with a Stock Keeping Unit (SKU) number or code as well as other information for identifying a specific item or style of merchandise. The retailer's SKU number may be either an entirely different number used to identify each product (e.g., by style) or a modified version of the manufacturer's UPC number, derived, perhaps, by adding a SKU number to the UPC number, for example.

A POS terminal, a kiosk terminal, or a sales person's handheld terminal might be coupled to a store computer system, such as a network server or some other store platform host, which is able to recognize and process UPC and/or SKU information which has been manually keyed-in or sensed and interpreted by a device, such as a barcode reader, coupled to the terminal. The computer system typically includes a database which stores information relating to the retailer's product inventory, such as stocked merchandise, a UPC and/or SKU number for each item of merchandise, and various types of merchandise identification information, such as price, inventory, style, color, size, etc., which is associated with each UPC and/or SKU number. When a customer purchases an item of merchandise, store personnel frequently use an automated terminal to read the barcode markings which are attached to the item. A computer interprets the UPC and/or SKU number comprised by the barcode, accesses the database to determine the price for each item, and maintains a running total of the total transaction price.

One problem that results from the independent identification schemes of the manufacturer and the retailers is that there is no way for the manufacturer to track the quantity of any particular product that each retailer sold. For example, even if a manufacturer obtains all of the SKU numbers representing items purchased from Retailer 1 and Retailer 2 by consumers, the manufacturer has no means for determining which SKU number corresponds to the manufacturer's UPC, since the UPC's and SKU numbers of the various retailers are not tracked and matched.

In view of the foregoing, a need exists for an incentive or loyalty program which overcomes the shortcomings of the prior art. Thus, there is a need for a system and method which provides a universal customer incentive program that networks various levels of the product distribution chain, such as manufacturers, wholesalers, and retailers, to provide incentives to consumers to purchase products not only from a particular merchant or group of merchants but also from particular manufacturers, who are not necessarily related to the specific merchant who sells the manufacturer's products to the consumer. Additionally, a need exists for a system and method for gathering data which associates particular consumer purchasing behaviors and specific products or product criteria across a manufacturer's distribution channels.

SUMMARY OF THE INVENTION

The present invention encourages users to not only pay themselves first, but to pay themselves first in the largest amounts possible, even if they are not able to fully pay outstanding debts. In general, the system obtains information related to the user's income, income sources, user's debts (e.g., bills) and user's goals and determines a savings amount for transfer to a user savings account. The system In an embodiment, the system determines a payment hierarchy based upon the savings amount, the plurality of penalties and the community recommendation, wherein the payment hierarchy minimizes the plurality of penalties. In various embodiments the savings amount and/or the payment hierarchy may be determined based upon transaction account information (e.g., one or more credit card transactions), a donation amount (e.g., for a charity), a recommendation formulated by a personalized financial advice network (e.g., a group created from a social network) and a new income opportunity that may identified to the user by the system.

The system and/or the user may determine a payment hierarchy which includes transferring funds to the user's savings account prior to paying all or a portion of certain bills. In one embodiment, the payment hierarchy comprises a strategy for minimizing penalties associated with a plurality of user debt obligations.

In one embodiment, the invention allocates income to a user savings account and to user debts by receiving user financial information, wherein the financial information includes, for example, user income information related to user income, user income source information related to user income sources, user debt information related to user debts and user savings goal information related to user goals; providing at least one recommendation, wherein the recommendation includes, for example, suggestions for minimizing penalties and/or fees associated with debt obligations and maximizing user savings; establishing a payment hierarchy based at least in part on the recommendation, wherein the payment hierarchy includes at least a portion of a payment allocated to the user savings account and a portion allocated to the user debts; acquiring user income; and, transferring user income, based at least in part upon the payment hierarchy, to at least one of user savings account and user debts. The invention also monitors a consumer's purchasing activity based upon an established budget.

The transfer of funds may include any system or method for transferring funds such as, for example, prompting a user to transfer user income, prompting a user to select a particular transfer of funds, and providing at least one of cash and negotiable instrument to at least one of a user, guardian and third party. The transfer of funds may then include withdrawing funds from a user account and depositing funds in a third party account, transferring user income to a financial instrument, and placing the selected funds in a pooled account.

In one embodiment, a computer enabled system is configured to enable user savings. The system comprises a computer configured to receive user financial information of a user, the user financial information comprising user savings goal information, user debt information and user income information. The system determines a revenue producing opportunity for the user. In various embodiments, the revenue producing opportunity may involve an opportunity for the user to become a franchisee, a sales representative, a retailer and a commissioned agent. For example, the system may determine based upon, for example a user savings goal or a user income source, that the user is either training to be a chef or is already working as chef. The system may also determine based upon, for instance advertiser information, job listings or direct solicitation from an employer, that an opportunity exists to earn commission to for selling knives.

The system forecasts a new income based upon the revenue producing opportunity. The system determines a savings amount, or adjusts a predetermined savings amount, based upon the forecast of new income. The savings amount is transferred to a user savings account. The system determines a payment hierarchy based upon the savings amount, the forecasting and user financial information such as user debt information, user income information and user goal information. In an embodiment, the system further receives the new income from a provider of the revenue producing opportunity.

BRIEF DESCRIPTION OF THE DRAWINGS

The invention will hereinafter be described in conjunction with the appended drawing figures, wherein like numerals denote like elements, and.

DETAILED DESCRIPTION

Figure 1:
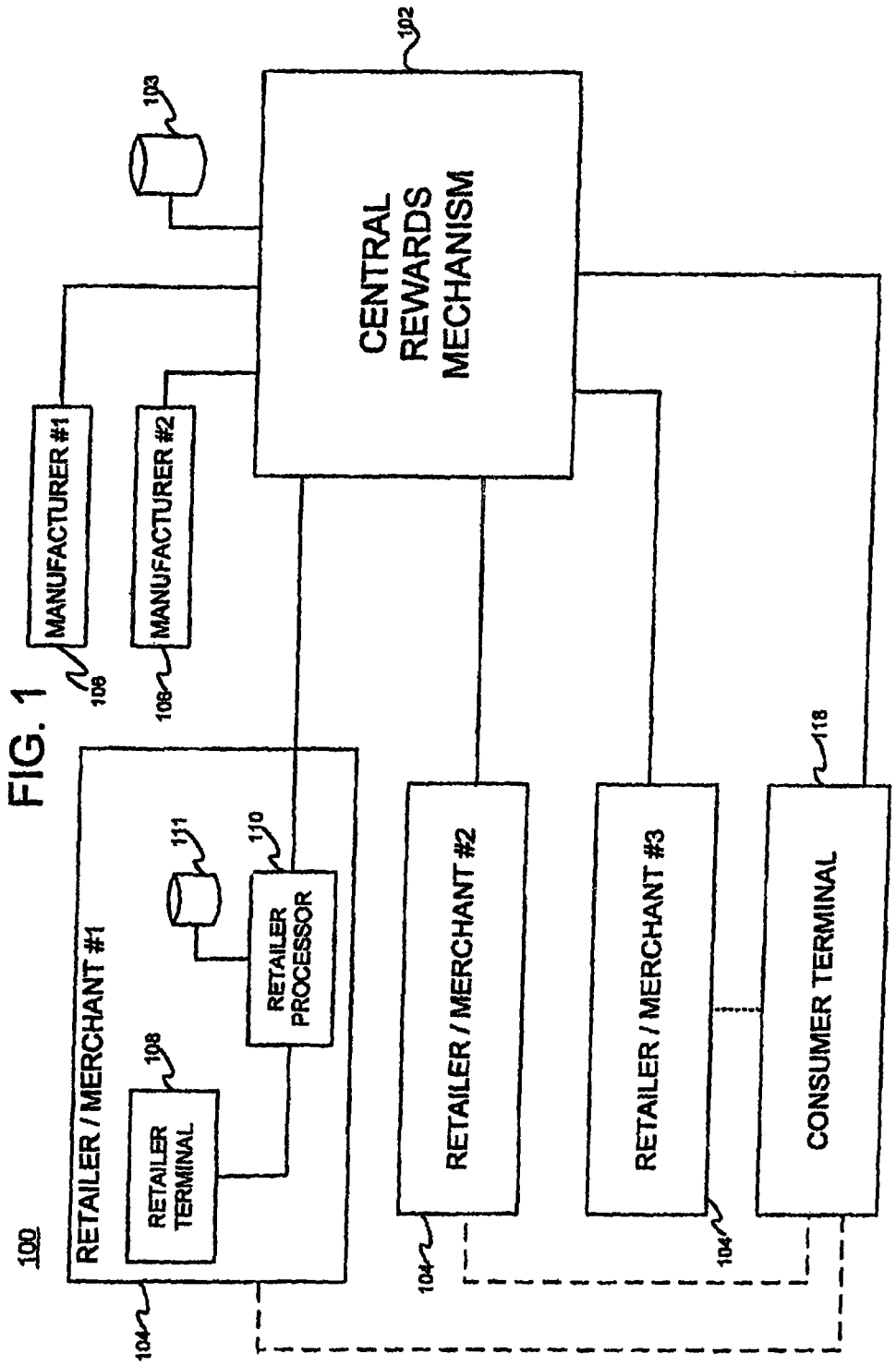
FIGS. 1-3 are schematic block diagrams illustrating exemplary incentive systems in accordance with various aspects of the present invention.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

As used herein, the terms "user" and "participant" shall interchangeably refer to any person, entity, charitable organization, machine, hardware, software, or business who accesses and uses the system of the invention, including consumers, retailers, manufacturers, and third-party providers. Participants in the system may interact with one another either online or off-line.

As used herein, the term "online" refers to interactive communications that take place between participants who are remotely located from one another, including communication through any of the networks or communications means described above or the like.

The term "manufacturer" shall include any person, entity, charitable organization, machine, software, hardware, and/or the like that manufactures, distributes, or originates a product or service which may ultimately be offered to a consumer directly or indirectly through a retailer. The term "manufacturer" may also include any party that generates and/or provides manufacturer item identifiers.

The term "retailer" shall include any person, entity, charitable organization, machine, software, hardware, and/or the like that that offers a product or service to a consumer. As used herein, the term "retailer" is used interchangeably with the term "merchant". Moreover, in this context, a retailer or merchant may offer or sell, either online or off-line, products and/or services made or supplied by at least one manufacturer.

As used herein, the phrases "network level" and "network-wide level" shall refer to a system that includes more than one retailer and at least one manufacturer.

As used herein, the terms "purchaser", "customer", "consumer", and "end-user" may be used interchangeably with each other, and each shall mean any person, entity, charitable organization, or business which uses a consumer ID to participate in the present system.

A "consumer ID", as used herein, includes any device, code, or other identifier suitably configured to allow the consumer to interact or communicate with the system, such as, for example, a rewards card, charge card, credit card, debit card, prepaid card, telephone card, smart card, magnetic stripe card, bar code card, transponder, authorization/access code, personal identification number (PIN), Internet code, other identification code, and/or the like. Additionally, a "consumer ID" may comprise any form of radio wave, electronic, magnetic, and/or optical device capable of receiving (uploading) and/or transmitting (downloading) data to and/or from itself to a second device which is capable of interacting and communicating with such forms of consumer ID.

"Consumer enrollment data" may comprise any of the following: name; address; date of birth; social security number; email address; gender; the names of any household members; survey data; interests; educational level; and/or any preferred brand names. A consumer may register to participate in the present system by any methods known and practiced in the art. For example, a consumer may be enrolled automatically (e.g., if the consumer holds an existing consumer account with the system administrator), over the phone, at the point of sale (e.g., through a paper application or a verbal interview), through the mail, or through instant enrollment online. Upon enrollment, the consumer receives a consumer ID that is associated with a consumer account.

In an exemplary aspect, "consumer enrollment data" may also comprise a transaction card number for charging any fees that may be associated with participation in the system and/or for facilitating the purchase of goods and services through the virtual purchasing system described below. In this context, a "transaction card number" may include any device, code, or suitable financial instrument representing an account with a financial institution, such as a bank, a card issuer, and/or the like, wherein the device, code, or other suitable financial instrument has a credit line or balance associated with it, and wherein the credit line or balance is in a form of financial tender having discrete units, such as currency. Moreover, a "transaction card number", a "transaction card", or a "card", as used herein, includes any device, code, or financial instrument suitably configured to allow the cardholder to interact or communicate with the system, such as, for example, a charge card, credit card, debit card, prepaid card, telephone card, smart card, magnetic stripe card, bar code card, authorization/ access code, personal identification number (PIN), Internet code, other identification code, and/or the like.

A "consumer profile", as used herein, shall refer to any data used to characterize a consumer and/or the behavior of a consumer. In the context of a commercial transaction, "a consumer profile" shall be understood to include, for example, the time and date of a particular purchase, the frequency of purchases, the volume/quantity of purchases, the transaction size (price), and/or the like. Additionally, in other transactional contexts, the term "consumer profile" shall also be understood to include non-purchase behaviors of a consumer, such as consumer enrollment data, visiting a Web site, referrals of prospective participants in the system, completion of a survey or other information gathering instrument, and/or the like. For instance, a participating online consumer may earn rewards points automatically through a triggering event, such as visiting a Web site, completing an online survey, or clicking on a banner advertisement for example. Off-line, a participating consumer may earn rewards points by completing a task or showing their consumer ID to the cashier and triggering the cashier to provide a "behavior" ID which may be input (e.g., by scanning a bar code on a paper survey for example) into the POS terminal. Further, any aspects of the consumer profile may be used in the context of data analysis.

A "third-party provider" may comprise any additional provider of goods and/or services to a consumer. Specifically, a "third-party provider" includes any party other than the particular manufacturer and retailer who is involved in a transaction with a consumer. A third-party provider may include, for example, a financial institution, such as a bank or an issuer of a financial instrument (such as a credit card or a debit card). A third-party provider may also include a provider of goods and services which are offered as awards to consumers in exchange for a requisite number of reward points.

Though the invention may generically be described with reference to a series of transactions which transfer a good or service from an originating party to an intermediary party and a subsequent transaction which transfers the good or service from the intermediary party to an end-user of that good or service, for convenience and purposes of brevity and consistency, the present disclosure generally refers to the originating party as a "manufacturer", the intermediary party as a "retailer", the end-user as a "consumer", and a good or service as a "product" or "item". However, it will be recognized by those of ordinary skill in the art that the retailer need not provide a product or item to a consumer in exchange for monetary currency. While this often may be the case, the present disclosure is not so limited and includes transactions which may be gratuitous in nature, whereby the retailer transfers a product or item to a consumer without the consumer providing any currency or other value in exchange. It is further noted that additional participants, referred to as third-party providers, may be involved in some phases of the transaction, though these participants are not shown. Exemplary third-party providers may include financial institutions, such as banks, credit card companies, card sponsoring companies, or issuers of credit who may be under contract with financial institutions. It will be appreciated that any number of consumers, retailers, manufacturers, third-party providers, and the like may participate in the system of the present invention.

As used herein, the term "UPC" and the phrase "manufacturer item identifier" shall refer to any symbol or indicia which provides information and, in an exemplary embodiment, shall refer to any number, code, or identifier assigned by a manufacturer and associated with an item, including any type of goods and/or services, ultimately offered to a consumer or other end-user. Colloquially, a UPC is sometimes referred to as a SKU number. However, as used herein, the term "SKU" and the phrase "retailer item identifier" shall refer to any symbol or indicia which provides additional information and, in an exemplary embodiment, shall refer to any number, code, or identifier assigned by a retailer and associated with an item, including any type of goods and/or services, offered to a consumer or other end-user.

"Purchase data", as used herein, comprises data relating to the offer of any item to a consumer or other end-user. Purchase data may include any of the following: an item purchased, an item price, a number of items purchased, a total transaction price, a payment vehicle, a date, a retailer ID, a store ID, an employee identifier, a retailer item identifier, a manufacturer ID, a manufacturer item identifier, a loyalty identifier, and/or the like.

"Retailer ID" or "retailer identifier", as used herein, comprises any symbol, indicia, code, number, or other identifier that may be associated with a retailer of any type of goods and/or services offered to a consumer or other end-user. A retailer ID may also include or be associated with a "store ID", which designates the location of a particular store.

A "manufacturer ID" or "manufacturer identifier" comprises any symbol, indicia, code, number, or other identifier that may be associated with a manufacturer of any type of goods and/or services ultimately offered to a consumer or other end-user.

An "award" or "reward" may comprise any quantity of products, services, coupons, gift certificates, rebates, reward points, bonus points, credits or debits to a financial instrument, any combination of these, and/or the like.

"Data analysis", as used herein, shall be understood to comprise quantitative and qualitative research, statistical modeling, regression analyses, market segmentation analyses, econometrics, financial analyses, budgeting analyses, and/or the like. Such analyses may be used to predict consumer behaviors and/or correlate consumer profiles, retailer data, manufacturer data, and/or product or service data. Such analyses may also be used to monitor a consumer's personal finances by enabling a consumer to track their spending behaviors and patterns, as an individual or as part of a family, organization or other group.

The system of the present invention associates or maps manufacturer UPC data and retailer SKU data on a network level to reward consumers and/or to analyze the data for a variety of business purposes, such as market segmentation analyses and/or analyses relating to consumer spending behaviors or patterns for example. Rather than simply capturing transactions at a Record of Charge (ROC) level, that is, recording consumer purchases in a general fashion by designating purchase categories (such as "clothing", "electronics", or "hardware" for example), the system identifies the particular item purchased (such as "jeans", "stereo", or "hammer" for example) as well as its corresponding manufacturer. By matching or associating the retailer SKU and the manufacturer's UPC, the system permits the standardization of goods and/or services codes at the network level. This standardization not only permits a record of both the specific item purchased and its manufacturer, regardless of the particular retailer involved in the transaction, but it permits the mapping of multiple consumers, multiple goods and/or services, multiple retailers, and/or multiple manufacturers to advantageously cross-market goods and services to consumers.

In accordance with one aspect of the invention, the association of UPC and SKU data by the system facilitates implementation of an incentive or loyalty program by providing a universal rewards currency which may be "spent" by participants who have earned rewards and accepted by the other participants in the multi-tiered network created by the system. The network may comprise any number of participants, including consumers, retailers (and any of their employees), manufacturers, third-party providers, and the like. Each of these categories of participants may be considered a tier in the network, and each participant within the various tiers may design and implement an independent rewards scheme within the context of the universal environment provided by the system. For example, Manufacturer 1 may produce and assign a UPC to Item X. Item X may subsequently be offered for sale by both Retailer 1 and Retailer 2. Retailer 1 and Retailer 2 may then each assign an independent SKU number to Item X to facilitate their own tracking, inventory, and pricing schemes. A consumer may then purchase Item X from both Retailer 1 and Retailer 2.

Since the system is capable of processing, associating, and quantifying a variety of data, including consumer data, employee data, retailer data, manufacturer data, SKU number data corresponding to Item X, and UPC data assigned by Manufacturer 1, for example, this data can then be used by the manufacturer, the retailer, the system administrator, and/or a third-party provider to provide rewards to consumers, employees, retailers, etc. For example, a manufacturer may provide frequency-based incentives, such as every $10^{th}$ purchase of a particular item will be discounted by 50% for example, independent of and/or in addition to any incentives offered by the specific retailer involved in the transaction. Additionally, the manufacturer may provide sales incentives to the employees of retailers independent of and/or in addition to any employee incentive programs that the retailers may choose to implement.

Since rewards, which may be in the form of rewards points, may be earned across the various tiers in the network, rewards may also be used or spent across the various tiers in the network. Thus, any rewards points that an employee, for example, may earn by promoting a particular manufacturer's line of products, may be "spent" by that employee on goods or services provided by any participant in the network, not merely at the retailer who employs that employee. Likewise, any rewards points earned by a consumer may be spent on goods or services offered by any participant in the network.

In accordance with another aspect of the invention, the association of UPC and SKU data by the system facilitates data analysis on a network level based upon several factors, including any of the following: consumer ID, consumer profile, retailer ID, SKU number, UPC, manufacturer ID, and/or the like. The system may compile any of the above data across multiple participants for the purpose of data analysis, such as analyses which may be employed in strategic planning and marketing for example. The system of the invention may be used to compile, analyze, and report data in a manner which would inform any or all network participants that, for example, a specific consumer (1) has made multiple purchases of particular manufacturers' products; (2) has spent Q dollars over a certain time period; (3) at specific multiple retailers; and (4) of the purchases made, R dollars went towards the purchase of Product 1, S dollars went towards the purchase of Product 2, and T dollars went towards the purchase of Service 1. Moreover, the system may be used to compile, analyze, and report data that enable a retailer, a manufacturer, and/or a third-party provider to create a variety of targeted marketing promotions, such as, for example, (1) marketing Product 1 offered by Manufacturer 1 to consumers who purchase Product 2 offered by Manufacturer 2; (2) marketing Product 1 offered by Manufacturer 1 and sold by Retailer X to consumers who purchase Product 2 offered by Manufacturer 2 at Retailer Y; and/or (3) marketing Product 1 offered by Manufacturer 1 and sold by Retailer X to consumers who purchase Product 2 offered by Manufacturer 2 at Retailer Y five times a year. It will be appreciated that these are but a few of the many possible applications for data gathered and generated by the system of the present invention.

In accordance with a further aspect of the invention, the system administrator may allocate rewards points to participants in the system. In one embodiment, participating retailers and/or manufacturers may purchase points from the system administrator and the points are then allocated to an account associated with the retailer and/or manufacturer. In an alternate embodiment, the system administrator may give or donate points to participating retailers and/or manufacturers. The system administrator maintains an account with each of the participating retailers and manufacturers and tracks available points balances and/or balances owing on a rolling basis. The points purchased by the retailers and/or manufacturers may then be earned by and issued to consumers in a manner that is predetermined by the retailer and/or manufacturer involved in the transaction with the consumer. For example, Retailer 1 may purchase 10,000 points from the system administrator and then offer consumers 1 point for every $10 dollars spent in Retailer 1's store or, perhaps, some number of points for every fifth transaction in the store. Moreover, Manufacturer 1, who produces the product offered by Retailer 1, may also purchase points from the system administrator. Thus, when a consumer purchases Manufacturer 1's product at Retailer 1, Manufacturer 1 may issue some number of points to the consumer. The issuance of points, either by retailers or manufacturers, may be based upon any selected criteria, including a points-for-dollars ratio, a defined quantity of points per item or per transaction, some combination of these, and/or the like.

The system administrator maintains an account for each participating consumer and apprises the consumer of the points totals and account activity. The consumer may review the total number of points in the account either online or off-line, such as through a periodic statement sent by the system administrator or through the use of a communications network, such as the Internet, for example. Points in the consumer's account are accumulated across the multiple retailers and/or manufacturers participating in the system. Thus, points earned by a consumer based upon transactions with different retailers and/or manufacturers are combined, resulting in a rapid accrual of points. The system administrator offers a catalog of products and services, which may be either online or off-line, from which consumers may select rewards in exchange for accrued points. In this manner, consumers advantageously earn points based upon their everyday purchases of products and services, these points are accrued across retailers and/or manufacturers, and points redemption takes place through a single, universal catalog of rewards. Many of the features and functions may be integrated by one skilled in the art with any of the following additional loyalty systems and methods, namely U.S. Ser. No. 10/010,947 filed on Nov. 6, 2001 entitled "System And Method For Networked Loyalty Program", and U.S. patent application Ser. No. 09/836,213, filed Apr. 17, 2001 and entitled "System and Method for Networked Loyalty Program", which are both hereby incorporated by reference in their entirety.

In accordance with the present invention, FIG. 1 is a diagram illustrating an exemplary embodiment of an incentive or loyalty system 100. System 100 comprises a central rewards mechanism 102; a plurality of retailer/merchant systems 104; and at least one manufacturer 106. One skilled in the art will appreciate that system 100 may comprise any number of retailer systems 104 and any number of manufacturers 106.

The central rewards mechanism 102 manages the incentive or loyalty program of the system 100. In an exemplary embodiment, central rewards mechanism 102 receives, processes, and stores manufacturer data, such as information regarding products and/or services and UPC data, transmitted by manufacturers 106 who have enrolled in the system 100. Manufacturers 106 may transmit data to central rewards mechanism 102 in any form and by any means known in the art, including any of the communications means described above. The manufacturer data is stored by the central rewards mechanism 102 in database 103. Database 103 may be any type of database, such as relational, hierarchical, object-oriented, and/or the like. Common database products that may be used to implement database 103 include DB2 by IBM (White Plains, N.Y.), any of the database products available from Oracle Corporation (Redwood Shores, Calif.), Microsoft Access by Microsoft Corporation (Redmond, Wash.), or any other database product. Database 103 may be organized in any suitable manner, including as data tables or lookup tables.

The central rewards mechanism 102 may receive and process consumer ID information and purchase data from any of the retailer systems 104. The central rewards mechanism 102 may also associate a particular consumer ID with the purchase data and a corresponding manufacturer item identifier. In one embodiment, the central rewards mechanism 102 performs an analysis involving any of the following: a consumer ID, purchase data, a points ratio, a consumer profile, a retailer ID, and a manufacturer ID. The analysis may be dependent upon an association of the consumer IDs, the purchase data, and the manufacturer item identifier. The analysis may further comprise, for example, a calculation of rewards points and/or other analyses for purposes of market segmentation, determining consumer spending behavior, correlating spending behavior and consumer demographics, and/or the like, as described in greater detail above.

In one exemplary embodiment, the central rewards mechanism 102 stores and informs a consumer of the rewards points that have been earned by a particular transaction as well as accumulated over time. The number of rewards points calculated and awarded by the central rewards mechanism 102 for a particular purchase may depend upon a predetermined rewards ratio. The rewards ratio may be determined by the retailer, the system administrator, the manufacturer of the purchased item, and/or any other suitable third-party. For example, if a participating consumer buys a product from a retailer for $100 and if the retailer rewards ratio is one reward point for each dollar of the purchase price (i.e., one-for-one), once the consumer's consumer ID is identified by the system, the consumer is credited with a suitable number of rewards points from the retailer, which, in this case, would be 100 points. However, if the manufacturer also chooses to issue rewards points for the item purchased, the manufacturer may select a points ratio that is different from the retailer's selected ratio. In the illustrated example, if the manufacturer's selected points ratio is two-for-one, then the consumer will be awarded an additional 200 points from the manufacturer for this single $100 purchase. In this manner, the system of the invention may provide "earn accelerators" through which consumers may accumulate rewards points at a comparatively rapid rate. In other words, a single purchase may generate rewards points for a consumer from any or all of a retailer, a manufacturer, and/or a third-party provider, and those rewards points may be used as rewards currency by the consumer throughout the network established by the system of the invention.

In an exemplary embodiment, retailer system 104 comprises a retailer terminal 108 and a retailer processor 110 in communication with database 111. Retailer terminal 108 comprises any device capable of identifying a consumer ID. Exemplary devices for identifying a consumer ID may include: a conventional card reader which recognizes a magnetic stripe or bar code associated with a consumer ID; a biometric device; a smart card reader which recognizes information stored on a microchip integrated with a consumer ID; and any device capable of receiving or uploading consumer ID data transmitted electronically, magnetically, or optically; and/or the like. In one embodiment, retailer terminal 108 and retailer processor 110 are co-located at a retail store. In another embodiment, retail terminal 108 and retailer processor 110 are remote from each other.

Figure 2:
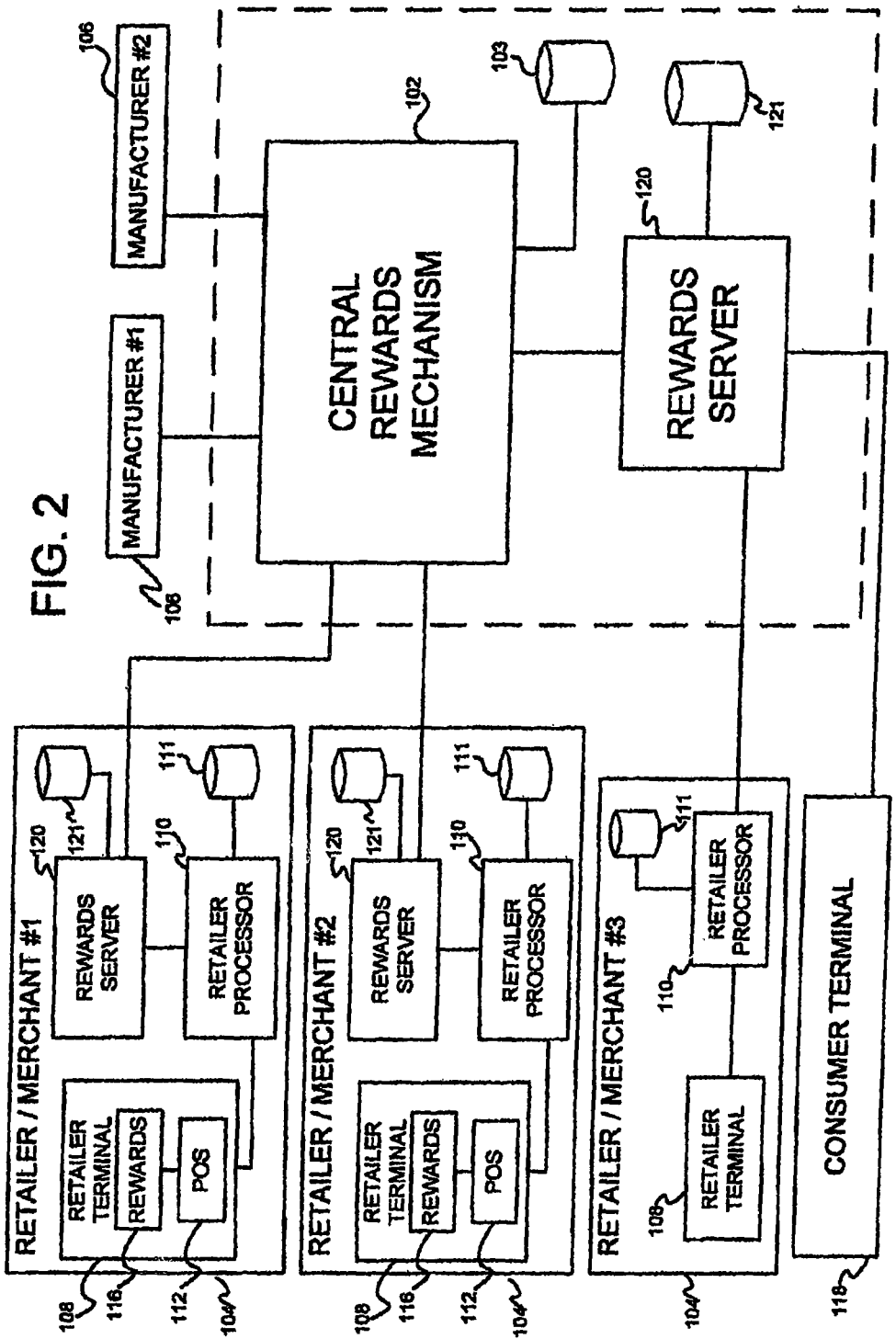

In an exemplary embodiment, as illustrated in FIG. 2, retailer terminal 108 comprises a retailer POS terminal 112, such as a cash register or an online retailer Web site, for example. When a consumer ID is used at the time an item is purchased, purchase data, including a SKU number, is input, sensed, or otherwise recognized by terminal 108, and then the purchase data is processed and stored by retailer processor 110. Retailer processor 110 comprises or is in communication with a suitable database 111 or other storage device for maintaining and storing purchase data and any other suitable retailer information. Database 111 may be any type of database, such as any of the database products described above for example. Database 111 may be organized in any suitable manner, including as data tables or lookup tables. Purchase data that is stored in database 111 is available to the retailer's local back office system (not shown) for inventory, accounting, tax, data analysis, and other purposes. The captured purchase data may include the item purchased, the item's unit price, the number of items purchased, the date, the store location, an employee ID, and any other information related to the purchase. In an exemplary embodiment, retailer processor 110 may also receive, process, and store manufacturer data, such as information regarding products and/or services and UPC data, from manufacturers 106 who have enrolled in the system 100. The manufacturer data may be stored in any suitable form, including data tables or lookup tables.

Figure 3:
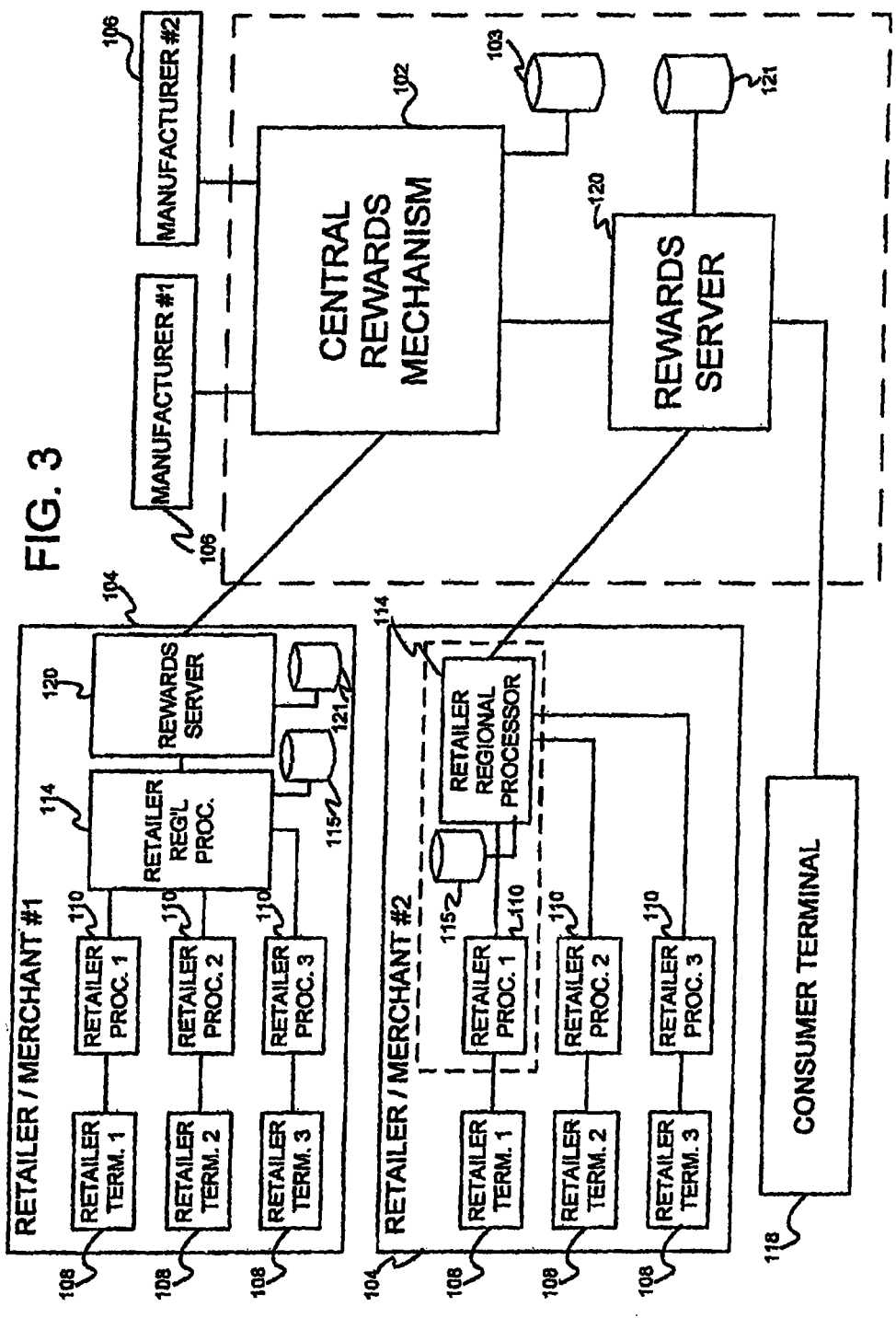

In accordance with the exemplary embodiments illustrated in FIG. 3, purchase data may also be transmitted to, and then processed and stored by, a retailer regional processor 114 (or, alternatively, a retailer national processor (not shown)) in communication with database 115 for the purpose of further back office and cumulative data analysis. Database 115 may be any type of database, such as any of the database products described in greater detail above for example. Database 115 may be organized in any suitable manner, including as data tables or lookup tables. In an exemplary embodiment, retailer processor 110 optionally may be integrated with retailer regional processor 114 (illustrated by the phantom lines encompassing Retailer Processor 1 and retailer regional processor 114 within the system of Retailer/Merchant #2), thereby forming a single device. In another embodiment, retailer processor 110 and retailer regional processor 114 are separate devices which may be either co-located with each other or remotely located from one another. For example, in one embodiment, retailer processor 110 and regional processor 114 are co-located at a particular retail store. In another embodiment, retailer processor 110 is located at a particular retail store and retailer regional processor 114 is remotely located at a regional office.

Regardless of the location of retailer regional processor 114, retailer regional processor 114 receives and processes similar information from each of the retailer processors 110 associated with each of the retail stores owned by the same retailer. Whether the system 100 comprises a retailer regional processor 114 or a retailer national processor may be a function of the number of stores maintained by a particular retailer. That is, a larger retailer who has numerous stores throughout the country, for example, may choose to have a plurality of regional processors, while a smaller retailer with a few stores scattered across the country may be better served by a single, national processor. In exemplary embodiments, the retailer regional processors 114 and/or national processors communicate with a suitable database 115 or other storage device which is configured to store and maintain purchase data and any other suitable retailer information. In another exemplary embodiment, retailer regional processor 114 may receive, process, and store manufacturer data, such as information regarding products and/or services and UPC data, from manufacturers 106 who have enrolled in the system 100. The manufacturer data may be stored in any suitable form, including data tables or lookup tables.

With momentary reference to FIG. 2, retailer terminal 108 may comprise a rewards terminal 116 through which a consumer may be updated with regard to various aspects of the system. For example, rewards terminal 116 may inform a consumer of the number of reward points that they have accumulated from all system participants and the types of awards that may be obtained using those reward points. Moreover, rewards terminal 116 may suggest to the consumer various awards for which the consumer is eligible based upon the rewards points generated by the consumer's network-wide purchases. In this context, network-wide purchases include any purchases of items corresponding to retailers and/or manufacturers participating in the system 100.

In an exemplary embodiment, rewards terminal 116 operates in real-time. In this context, "real-time" means that reward points are immediately, or nearly immediately, updated at the time purchases are made and are therefore immediately redeemable by the consumer at the a point of sale. Thus, for example, a consumer may be informed by rewards terminal 116 at the point of sale that the item being purchased by the consumer may be purchased using the consumer's accumulated reward points, including points accumulated on a network level. Points accumulated on a network level enable consumers to accumulate points more rapidly than would be possible if only a single retailer or group of retailers were issuing the points. In one embodiment, rewards terminal 116 may update a consumer's rewards points in real-time and, in response to the consumer's particular points total, issue a coupon, a gift certificate, and/or additional bonus points to the consumer.

In another exemplary embodiment, the system may operate in batch mode, wherein points totals are calculated, stored, and periodically updated for access by the retailer terminal 108, including POS terminal 112 and/or rewards terminal 116. Thus, in this embodiment, the consumer may be notified of available points sometime after a purchase, or a suggestive sale may take place after a purchase. The total point count or suggestive sale may take into account points generated and accumulated as the result of network-wide purchases.

In various alternate embodiments of the invention, retailer terminal 108 may include a rewards terminal 116 but not a POS terminal 112; a POS terminal 112 but not a rewards terminal 116; or a POS terminal 112 in communication with a rewards terminal 116. In alternate embodiments, where terminal 108 includes a POS terminal 112 and a rewards terminal 116, the two terminals 112 and 116 may be variously implemented as separate terminals, integrated terminals, or software within a device. In another embodiment, where terminal 108 comprises a rewards terminal 116 but not a POS terminal 112, terminal 108 may be a kiosk terminal located within a retail store or some other remote terminal which is capable of recognizing a consumer ID and communicating with the system 100. A consumer may use independent rewards terminal 116 to do, for example, any of the following: view accumulated reward points totals; view potential awards which the consumer may obtain in exchange for various numbers of points; select an award; redeem rewards points for a selected award; request and/or receive a reward points advisory statement; and/or view a directory of participating retailers, manufacturers, and third-party providers.

In another exemplary embodiment, system 100 further comprises a consumer terminal 118. Consumer terminal 118 is any remote terminal through which a consumer may access other aspects of the system 100. Consumer terminal 118 may comprise any of the input devices, computing units, or computing systems described above. Further, consumer terminal 118 communicates with the system 100 through any of the communications networks described above. In one embodiment, consumer terminal 118 permits a consumer to engage multiple facets of the system 100 in an interactive online communications environment. The interactive online environment made available through consumer terminal 118 is an extension of the network-level incentive award program and is implemented in conjunction with other aspects of the system 100. In this context, a consumer may use consumer terminal 118 for a variety of purposes. In one embodiment, consumer terminal 118 may be used to communicate with and receive information from the central rewards mechanism 102. For example, a consumer may use consumer terminal 118 to do any of the following: enroll in the system; receive statements or reports regarding accumulated reward points totals; receive bonus details; view potential awards which the consumer may obtain in exchange for various numbers of points; select an award; receive redemption information; view points adjustments; redeem rewards points for a selected award; request and/or receive a reward points advisory statement; receive information regarding where and how points were earned and/or how points were redeemed; receive information regarding expiration dates for points earned; receive information relating to any applicable fees; receive information regarding marketing promotions; and/or view a directory of participating retailers, manufacturers, and/or third-party providers.

In another embodiment, consumer terminal 118 may be used to interact with and/or make purchases and generate rewards points from participating online retailers, as illustrated by the various phantom lines in FIG. 1. The online retailer may then communicate with the central rewards mechanism 102 to transmit and process a consumer ID, purchase data, etc., as described above with reference to retailer 104 of FIG. 1. Information communicated between the online consumer, the online retailer, and the online central rewards mechanism may include, for example, product or service information, prices, availability of the product or service, shipping information, rewards points information, available awards, information regarding points ratios and points redemption, and/or the like. In one embodiment, consumer terminal 118 operates in real-time, as described above with respect to rewards terminal 116. In another embodiment, the consumer terminal 118 may operate in batch mode, as described above. In still a further embodiment, consumer terminal 118 operates in a manner which includes aspects of both real-time functionality and batch mode functionality.

In accordance with a further aspect of the invention, the system 100 may comprise a rewards server 120 in communication with a database 121, as illustrated in FIG. 2. Database 121 may be any type of database, such as any of the database products described above for example. Database 121 may be organized in any suitable manner, including as data tables or lookup tables. In an exemplary embodiment, rewards server 120 may be any hardware and/or software that is configured to communicate with the central rewards mechanism 102 and either the retailer processor 110 or the retailer regional processor 114. In alternate exemplary embodiments, rewards server 120 may be integrated with retailer system 104; rewards server 120 may be integrated with central rewards mechanism 102; or rewards server 120 may be separate from both retailer system 104 and central rewards mechanism 102. In a further embodiment, the rewards server 120 may communicate with both a retailer national processor (not shown) and the central rewards mechanism 102.

In an exemplary embodiment, rewards server 120 receives, processes, and stores both manufacturer data and retailer data. Manufacturer data may include descriptions of products and/or services and UPC data transmitted from manufacturers 106 who have enrolled in the system 100. The manufacturer data may be stored in any suitable form, including data tables or lookup tables. Retailer data may include descriptions of products and/or services and SKU data transmitted from retailers 104 who have enrolled in the system 100. The retailer data may be stored in any suitable form, including data tables or lookup tables.

In an exemplary embodiment, the rewards server 120 performs a plurality of functions that might otherwise be performed by the central rewards mechanism 102. For example, since rewards calculations require significant processing and memory resources, performance of calculations processing by the rewards server 120 at the regional level lessens the processing load on the central rewards mechanism 102, thereby increasing the efficiency of the central rewards mechanism 102. In an exemplary embodiment, each retailer's region, which comprises a plurality of that retailer's stores or outlets, accesses a rewards server 120 which acts as an intermediary between the retailer regional processor 114 and the central rewards mechanism 102. This configuration relieves the processing, power, memory, and other requirements of the central rewards mechanism 102. Moreover, each retailer is but one of many retailers that may participate in the network level rewards structure. Accordingly, a plurality of rewards servers 120 may be in communication with the central rewards mechanism 102 as well as each of the participating retailer regional processors 114, further alleviating the processing burden and freeing up the resources of the central rewards mechanism 102.

Implementations which include at least one independent rewards server 120 are also advantageous because cost-effective communications links may be used to facilitate communications with the central rewards mechanism 102. Performance by the rewards server 120 of many of the "intelligence functions" of the system 100, permits transmission of only particular forms of purchaser information to the central rewards mechanism 102. In an exemplary embodiment, data sent from the rewards server 120 to the central rewards mechanism 102 may include the consumer ID and the total number of rewards points earned by a consumer in a particular transaction. In another exemplary embodiment, data transmitted by the rewards server 120 to the central rewards mechanism 102 may also include any pre-selected aspect of the consumer profile, any pre-selected aspect of the purchase data, and/or any other pre-selected data associated with a consumer, a retailer, a manufacturer, and/or a third-party provider. Pre-selection of the types of data transmitted by the rewards server 120 to the central rewards mechanism 102 may be conducted by the system administrator, a retailer, a manufacturer, and/or a third-party provider. Thus, data which may be useful for purposes of data analysis but unrelated to the rewards feature, such as the characteristics of the particular item purchased for example, may not need to be transmitted to the central rewards mechanism 102.

Exemplary functions performed by the rewards server 120 may include the association of UPC and SKU data; manipulation of the rewards criteria applicable in particular cases, which may further depend upon the retailer, manufacturer, and/or third-prty provider involved in a specific transaction with a consumer; calculation of rewards benefits earned by the consumer; filtration functions for determining which data is transmitted from the rewards server 120 to the central rewards mechanism 102; and/or various types of data analyses, as described above. In an exemplary embodiment, the retailer system 104 houses, maintains, and updates the hardware and/or software of the rewards server 120. In another embodiment, rewards server 120 may be housed, maintained, and updated by the system administrator.

In accordance with another embodiment of the present invention, the system 100 permits an open payment system. Since the invention generally provides that consumer participation in the system is based upon a consumer ID, a purchaser may use any of multiple payment vehicles (such as cash, check, charge card, credit card, debit card, MasterCard®, Visa®, and/or the American Express® Card for example) to make purchases at the various retailers and still participate in the system. Thus, in one embodiment, the consumer ID is independent of any particular payment vehicle, such as a credit card for example.

However, alternate embodiments of the invention may be implemented which associate a consumer ID with a particular payment vehicle, such as a consumer's credit card account, charge card account, debit card account, and/or bank account for example. In this embodiment, the retailer conducting the transaction need only participate in the system to the extent that the retailer provides its SKU data to the system 100, such as to the rewards server 120. In other words, when a consumer ID is associated with an instrument (e.g., a credit card) from a third-party provider, the retailer need not provide a rewards terminal or other terminal capable of processing the consumer ID, since the third-party provider may process the consumer ID as part of the payment transaction. Thus, in this embodiment, rewards benefits may be earned by the consumer on a network-wide level without the retailer's direct participation in the rewards feature (notwithstanding the retailer's participation in transmitting SKU data to the system). Moreover, it will be appreciated that a single consumer ID may be associated with multiple third-party payment vehicles, thereby allowing a consumer to generate rewards points regardless of the particular payment vehicle selected for a particular purchase.

Figure 4:
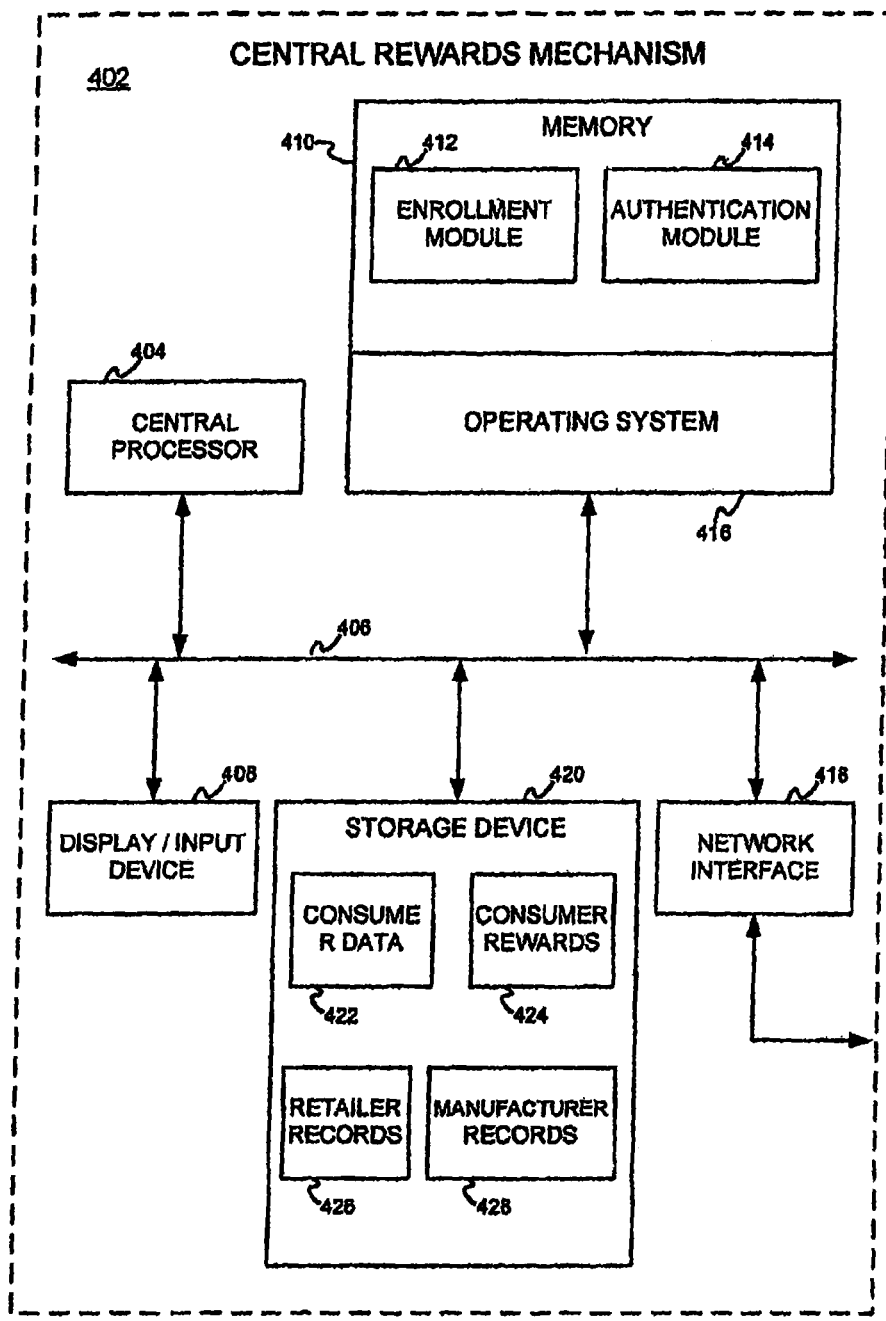
FIG. 4 is a schematic block diagram of an exemplary central rewards mechanism in accordance with the present invention.

With reference to FIG. 4, an exemplary central rewards mechanism 402 includes a central processor 404 in communication with other elements of the rewards mechanism 402 through a system interface or bus 406. A suitable display device/input device 408, such as a keyboard or pointing device in combination with a monitor, may be provided for receiving data from and outputting data to a user of the system. A memory 410, which is associated with the rewards mechanism 402, includes various software modules, such as an enrollment module 412 and an authentication module 414 for example. The memory 410 preferably further includes an operating system 416 which enables execution by central processor 404 of the various software applications residing at enrollment module 412 and authentication module 414. Operating system 416 may be any suitable operating system, as described above. Preferably, a network interface 418 is provided for suitably interfacing with other elements of the incentive awards system, such as the elements described above with reference to FIGS. 1-3.

Lastly, a storage device 420, such as a hard disk drive for example, preferably contains files or records which are accessed by the various software modules, such as enrollment module 412 and authentication module 414. In particular, consumer data 422 comprises information received from a consumer upon registration with the rewards mechanism 402. Consumer rewards 424 comprises data corresponding to each consumer's rewards account. Consumer rewards 424 may include cumulative rewards points totals as well as historical totals and rewards account activity over time. Retailer records 426 comprises information received from the various participating retailers. Manufacturer records 428 comprises information received from the various participating manufacturers. One skilled in the art will appreciate that the storage device 420 and, therefore, consumer data 422, consumer rewards 424, retailer records 426, and manufacturer records 428 may be co-located with the rewards mechanism 402 or may be remotely located with respect to the rewards mechanism 402. If the storage device 420 is remotely located with respect to the rewards mechanism 402, communication between storage device 420 and rewards mechanism 402 may be accomplished by any suitable communication link but is preferably accomplished through a private intranet or extranet.

Enrollment module 412 receives information from consumers, retailers, and/or manufacturers who wish to participate in the system. Enrollment module 412 accesses and stores information in storage device 420. Authentication and/or validation of the identity and status of participants, including any of the other system components, may be performed by the authentication module 414, which preferably has access to the records residing in storage device 420.

Figure 5:
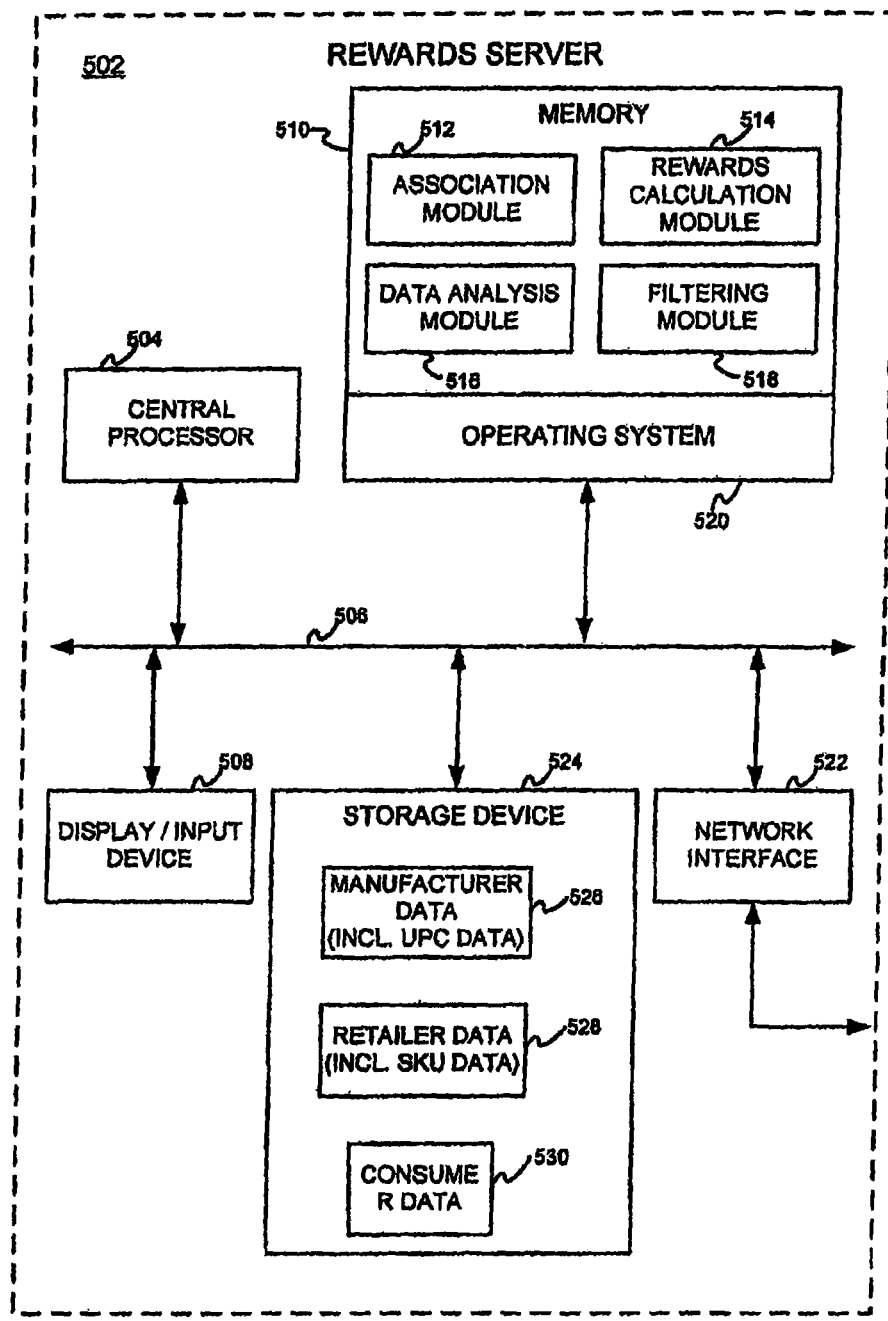
FIG. 5 is a schematic block diagram of an exemplary rewards server in accordance with the present invention.

With reference to FIG. 5, an exemplary rewards server 502 includes a central processor 504 in communication with other elements of the rewards server 502 through a system interface or bus 506. A suitable display device/input device 508, such as a keyboard or pointing device in combination with a monitor, may be provided for receiving data from and outputting data to a user of the system. A memory 510, which is associated with the rewards server 502, includes a variety of software modules, such as an association module 512, a rewards calculation module 514, a data analysis module 516, and a filtering module 518 for example. The memory 510 preferably further includes an operating system 520 which enables execution by central processor 504 of the various software applications residing at the various modules 512, 514, 516, and 518. Operating system 520 may be any suitable operating system, as described above. Preferably, a network interface 522 is provided for suitably interfacing with other elements of the incentive awards system, such as the elements described above with reference to FIGS. 1-3.

Lastly, a storage device 524, such as a database as described above for example, preferably contains files or records which are accessed by the various software modules 512, 514, 516, and 518. In particular, manufacturer data 526 comprises information received from a manufacturer, such as descriptions or other information regarding the manufacturer's products and/or services as well as UPC data for example. Retailer data 528 comprises information received from a retailer, such as descriptions or other information regarding the retailer's products and/or services as well as SKU data for example. Consumer data 530 comprises information pertaining to a consumer, including a consumer ID, purchase data, a consumer profile, and/or the like. One skilled in the art will appreciate that the storage device 524 and, therefore, manufacturer data 526, retailer data 528, and consumer data 530 may be co-located with the rewards server 502 or may be remotely located with respect to the rewards server 502. If the storage device 524 is remotely located with respect to the rewards server 502, communication between storage device 524 and rewards server 502 may be accomplished by any suitable communication link but is preferably accomplished through a private intranet or extranet.

Figure 6:
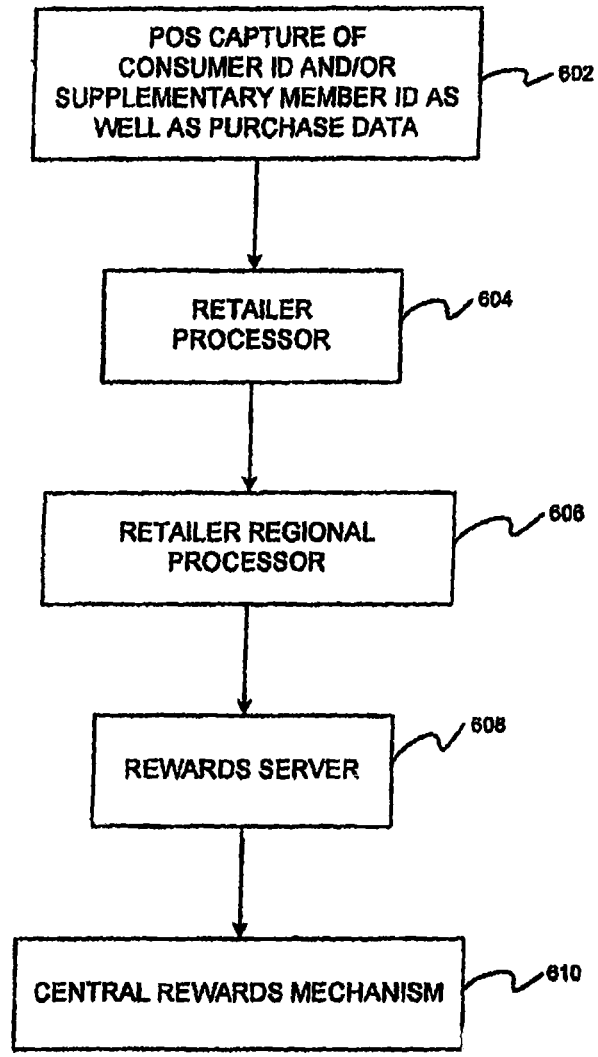
FIG. 6 is a flowchart illustrating an exemplary process for capturing and processing POS SKU data in accordance with the present invention.
Figure 7:
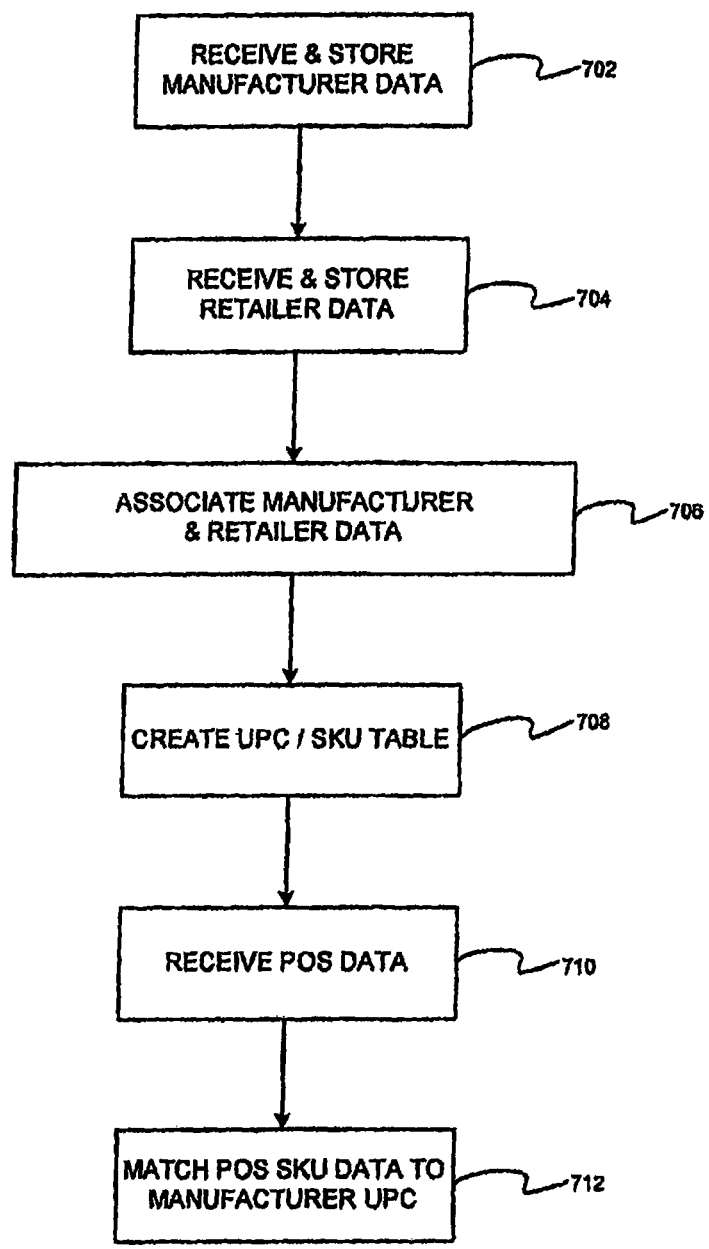
FIG. 7 is a flowchart illustrating an exemplary process for associating SKU data and UPC data in accordance with the present invention.

Referring next to FIGS. 6 and 7, the process flows depicted in these figures are merely exemplary embodiments of the invention and are not intended to limit the scope of the invention as described above. It will be appreciated that the following description makes appropriate reference not only to the steps depicted in FIGS. 6 and 7 but also to the various system components as described above with reference to FIGS. 1-3.

FIG. 6 is flowchart illustrating an exemplary process for capturing and processing POS SKU data in accordance with the present invention. The association or matching of UPC and SKU data begins with POS data capture (step 602). When a consumer presents a consumer ID to a retailer 104 at the time of purchasing an item from the retailer 104, the consumer ID is processed by a rewards terminal 116 that recognizes the consumer ID and identifies the consumer as a participant in the system 100. Purchase data is captured by the retailer POS terminal 112. Purchase data may include any of the following: a SKU number; a unit price; a total transaction price; the payment vehicle(s) used; a store ID which identifies the particular store location if a retailer operates more than one store; a department ID, if the store has multiple departments; the date of the transaction; the time of the transaction; the employee ID of the store clerk who facilitates the transaction; a POS terminal ID to identify the particular terminal conducting the transaction; any retailer-specific incentive program ID; and/or the like. The retailer POS terminal 112 creates a transaction file comprising the consumer data (including a consumer ID) and purchase data (including a SKU number associated with each item purchased), and the transaction file is then stored by the retailer processor 110 in database 111 (step 604).

The various transaction files may be consolidated by the retailer processor 110 and then forwarded to the retailer regional processor 114 (step 606) for further back-office and cumulative data analysis performed by retailer 104.

In an exemplary embodiment, the transaction file is transmitted by either of the retailer processor 110 or the retailer regional processor 114 to the rewards server 120 (step 608). The SKU information for each item included in the transaction file is then matched to or associated with corresponding UPC information which identifies the related manufacturer 106. An exemplary association process is illustrated in the flowchart of FIG. 7. Association of SKU and UPC data may be accomplished through any data association technique known and practiced in the art. For example, the association may be accomplished either manually or automatically. Automatic association techniques may include, for example, a database search, a database merge, GREP, AGREP, SQL, and/or the like.

In an exemplary embodiment, database 121 receives and stores manufacturer data, including UPC data, from manufacturer 106 (step 702). Database 121 also receives and stores retailer data, including SKU numbers, from retailer 104 (step 704). In an exemplary implementation, database 121 stores manufacturer data in a separate manufacturer data table for each participating manufacturer 106. Each manufacturer data table may comprise a plurality of fields, such as "UPC" and "product description" for example, and a plurality of records, each of which corresponds to an item offered by the participating manufacturer 106. In one embodiment, database 121 stores retailer data in a separate retailer data table for each participating retailer 104. Each retailer data table may comprise a plurality of fields, such as "SKU" and "product description", for example, and a plurality of records, each record corresponding to an item offered by a participating retailer 104.

Data from each of the manufacturer and the retailer data tables is then associated (step 706). The association step may be accomplished by a database merge function, for example, using a "key field" in each of the manufacturer and retailer data tables. A "key field" partitions the database according to the high-level class of objects defined by the key field. For example, a "product description" class may be designated as a key field in both the manufacturer data table and the retailer data table, and the two data tables may then be merged on the basis of the "product description" data in the key field. In this embodiment, the data corresponding to the key field in each of the merged data tables is preferably the same. That is, the product descriptions in the manufacturer data table matches the product descriptions in the retailer data table. However, manufacturer and retailer data tables having similar, though not identical, data in the key fields may also be merged by using AGREP, for example.

The result of the data association step is the creation of a separate data table, such as a UPC/SKU lookup table for example (step 708). Thus, when the rewards server 120 receives the data (e.g., consumer ID and SKU data) captured by the POS terminal (step 710), the rewards server 120 may search the UPC/SKU lookup table for the appropriate SKU number and then match the SKU to the corresponding UPC data (step 712). In an exemplary embodiment, the "SKU" and "UPC" fields in the UPC/SKU data table may be linked by an appropriate pointer. That is, when the rewards server 120 searches the UPC/SKU table and locates the particular SKU that has been captured and transmitted by the POS terminal, the specifically identified SKU datafield uses a pointer to direct the rewards server 120 to the UPC datafield that corresponds to that SKU number. In an exemplary embodiment, the UPC datafield may be linked by one or more additional pointers to other key fields, such as a consumer ID, a retailer ID, a manufacturer ID, and/or a third-party ID. These additional pointers may be used as means for compiling data which may be useful in any of the various data analyses performed by the rewards server 120. In this manner, the association of POS SKU numbers and UPC data may be used to create a context in which standardized, network-wide analyses may be conducted.

In an exemplary embodiment, the rewards server 120 utilizes the association information to calculate the rewards points generated by a consumer's purchase. For example, an appropriate series of pointers leading from a SKU to a UPC to a manufacturer ID may ultimately direct the rewards server 120 to employ a 2-for-1 manufacturer rewards ratio to award a consumer twice as many points as the dollar amount of the consumer's total transaction price. In another exemplary embodiment, an appropriate series of pointers may result in the calculation of rewards points based upon multiple rewards criteria, such as rewards criteria associated with the manufacturer of the item as well as rewards criteria associated with a third-party provider for example.

In a further embodiment, the rewards server 120 may use the association of UPC and SKU number data to analyze a variety of marketing variables across multiple manufacturers and retailers. For example, rewards server 120 may use a series of pointers leading from an SKU to a UPC and then to a "consumer profile" field or table to correlate, for instance, consumer spending behaviors, particular manufacturers, and/or specific products across multiple retailers for example.

In alternative embodiments, association of the UPC data and SKU number may take place at any of the rewards terminal 116, the retailer POS terminal 112, the retailer processor 110, the retailer regional processor 114 (or a retailer national processor), and/or the central rewards mechanism 102.

In one embodiment, the retailer 104 may offer an incentive or loyalty program that is independent from the program offered by the system 100. Alternatively, the retailer 104 may use the system's UPC data for its own internal purposes.

With momentary reference to FIG. 6, in one exemplary embodiment, the consumer ID and the earned rewards information are transmitted to the central rewards mechanism 102 after the rewards server 120 has filtered out consumer data associated with the consumer ID (step 610). In another embodiment, the central rewards mechanism 102 may use the captured and matched UPC information to determine rewards and/or for data analysis.

Figure 8:
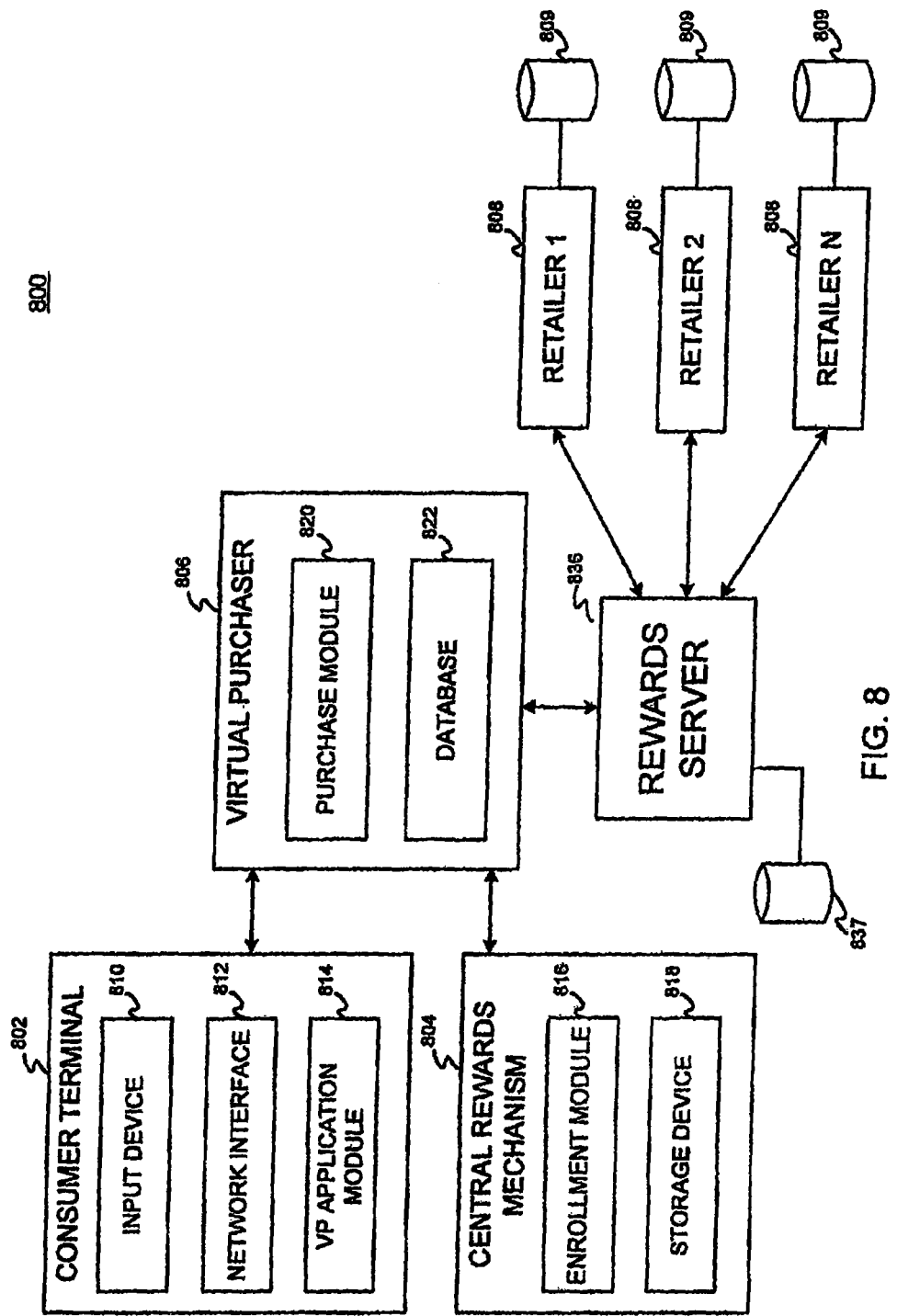
FIG. 8 is a schematic block diagram illustrating an exemplary virtual purchasing system in accordance with the invention.

In accordance with another aspect of the invention, FIG. 8 is an exemplary diagram illustrating an exemplary virtual purchasing system 800. Virtual purchasing system 800 creates a purchasing environment that combines the opportunity to physically inspect the goods that are offered for sale by "brick and mortar" retail establishments with the automation, convenience, and large selection offered by an online retail network. In an exemplary aspect, virtual purchasing system 800 facilitates a convenient purchasing environment which enables a consumer to select the particular goods that they wish to purchase, transmit data regarding the selected goods to a virtual purchaser, and then purchase the selected goods under perceived optimal conditions through the virtual purchaser. The perceived optimal conditions may include conditions such as lowest price, quickest estimated delivery time, or a preferred retailer, for example.

In the exemplary embodiment illustrated in FIG. 8, virtual purchasing system 800 comprises a consumer terminal 802, a central rewards mechanism 804, a virtual purchaser 806, and a retailer/merchant system 808. It will be appreciated that the system 800 may comprise any number of consumer terminals 802 and any number of retailer systems 808.

The consumer terminal 802 may be any remote terminal through which a consumer may access other aspects of the system 800. Consumer terminal 802 may comprise any of the input devices, computing units, or computing systems described above. In an exemplary aspect, consumer terminal 802 may be implemented in the form of an electronic handheld device or personal digital assistant, such as a Palm Pilot® available from Palm, Inc. (Santa Clara, Calif.), for example. Consumer terminal 802 communicates with the system 800 through any of the communications networks described above. In an exemplary aspect, consumer terminal 802 permits wireless communication with the system 800. In one embodiment, consumer terminal 802 may operate in real-time, as described above. In another embodiment, the consumer terminal 802 may operate in batch mode, as described above. In still a further embodiment, consumer terminal 802 operates in a manner which includes aspects of both real-time functionality and batch mode functionality.

In an exemplary aspect, consumer terminal 802 permits a consumer to engage multiple facets of the system 800 in an interactive online communications environment. The interactive online environment made available through consumer terminal 802 is an extension of the network-level system and is implemented in conjunction with other aspects of the system 800. In this context, a consumer may use consumer terminal 802 for a variety of purposes. In another exemplary aspect, consumer terminal 802 is adapted to input a retailer item identifier associated with an item located at a retailer's store and then communicate the retailer item identifier to virtual purchaser 806. In one embodiment, consumer terminal 802 comprises an input device 810; a network interface 812 which facilitates communication with the virtual purchaser 806; and a virtual purchaser (VP) application module 814.

Input device 810 may be any device that is capable of identifying a retailer item identifier. Input device 810 may be configured to communicate a retailer item identifier to consumer terminal 802 in real time or some time later. Input device 810 may be integrated with consumer terminal 802 or may be a separate component that is adapted to communicate with consumer terminal 802. Exemplary input devices may include devices for manually inputting a retailer item identifier (such as an alphanumeric keypad, for example) and devices for optically, electronically or digitally inputting a retailer item identifier (such as a bar code reader or scanner, for example).

In an exemplary embodiment, input device 810 includes a conventional bar code reader which is adapted to scan a retailer item identifier. In one embodiment, the bar code reader is integrated with, and is a part of, the consumer terminal 802. In this embodiment, the input device 810 is used to input a retail item identifier and then communicate the retail item identifier to consumer terminal 802 while, or soon after, reading the retail item identifier. In another embodiment, the bar code reader is a separate component (such as a wand or a pen for example). In this embodiment, input device 810 is configured to input and then store a retailer item identifier for later communication (e.g., downloading) to consumer terminal 802.

Network interface 812 may be any suitable interface for establishing a communications link between consumer terminal 802 and virtual purchaser 806 and may establish communication with virtual purchaser 806 by any of the communications means set forth in detail above. In one embodiment, network interface 812 facilitates wireless communication between consumer terminal 802 and virtual purchaser 806.

VP application module 814 is configured to facilitate interaction between consumer terminal 802 and virtual purchaser 806. After consumer terminal 802 receives a retailer item identifier from input device 810, VP application module 814 processes, stores, and/or communicates the retailer item identifier to virtual purchaser 806 via network interface 812.

The central rewards mechanism 804 is substantially similar to, and may comprise any of the components of, central rewards mechanism 102 and/or central rewards mechanism 402, as described above with reference to FIGS. 1-4. Moreover, central rewards mechanism 804 may be configured to include any of the functionality described above with reference to central rewards mechanism 102 and/or central rewards mechanism 402. In particular, central rewards mechanism 804 comprises an enrollment module 816, which is substantially similar to enrollment module 512 of FIG. 5, and a storage device 818, which is substantially similar to storage device 420 of FIG. 4. In one embodiment, enrollment module 816 receives consumer enrollment data from consumers and then processes and transmits the consumer enrollment data to storage device 818 for storage and future retrieval.

Figure 9:
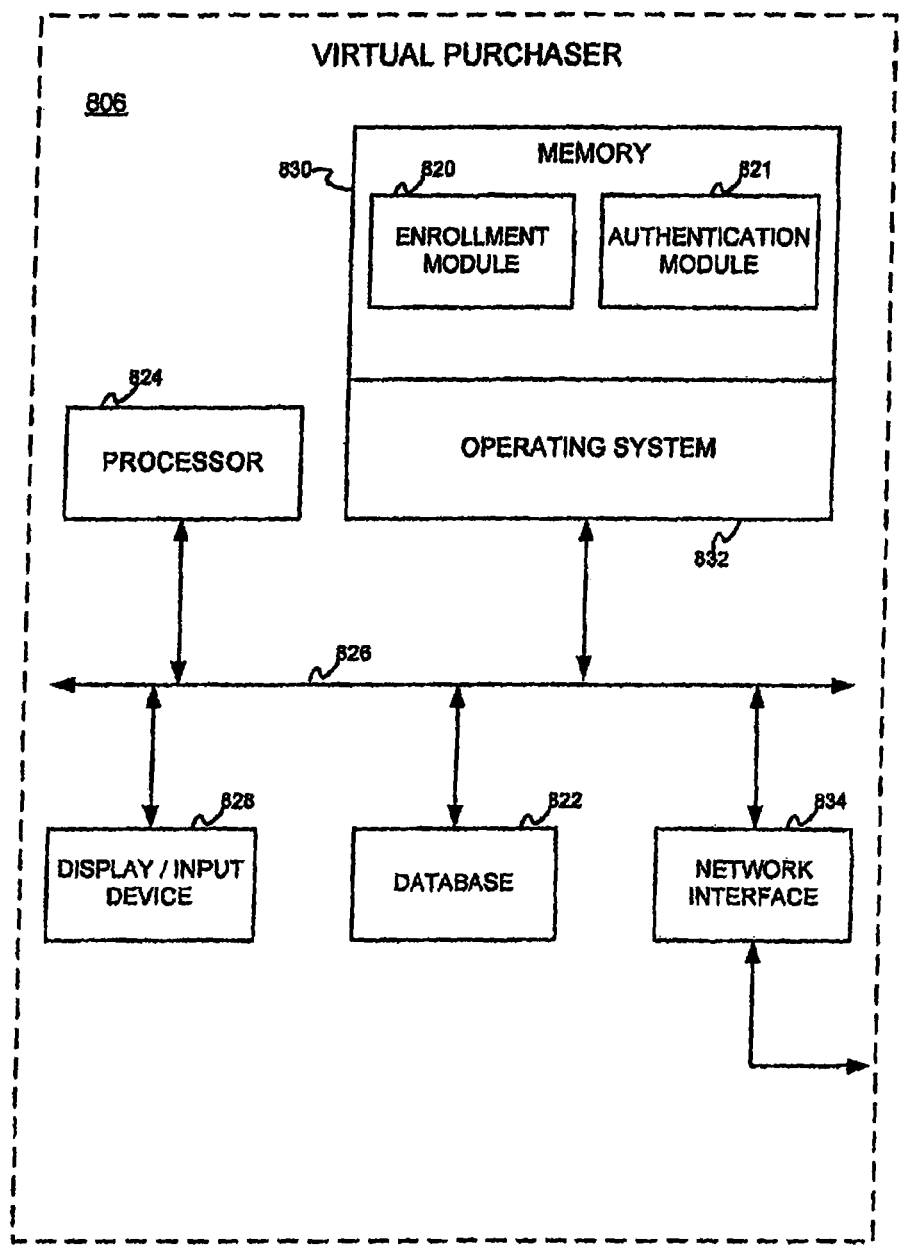
FIG. 9 is a schematic block diagram of an exemplary virtual purchaser in accordance with the invention.

In one embodiment, virtual purchaser 806 comprises a purchase module 820 and a database 822. As illustrated in FIG. 9, an exemplary virtual purchaser 806 further includes a processor 824 in communication with other elements of virtual purchaser 806 through an interface or bus 826. A suitable display/input device 828, such as a keyboard or pointing device in combination with a monitor, may be provided for receiving data from and outputting data to a user of virtual purchaser 806. A memory 830 associated with virtual purchaser 806 includes a purchase module 820. Memory 830 further includes an operating system 832 which enables execution by processor 824 of the software applications residing at purchase module 820. Operating system 832 may be any suitable operating system, as described above. The database 822 may be any type of database, such as relational, hierarchical, object-oriented, and/or the like. Common database products that may be used to implement database 822 include DB2 by IBM (White Plains, N.Y.), any of the database products available from Oracle Corporation (Redwood Shores, Calif.), any of the database products available from Sybase, Inc. (Emeryville, Calif.), Microsoft Access by Microsoft Corporation (Redmond, Wash.), or any other database product. In one embodiment, a network interface 834 is provided for facilitating the interface of virtual purchaser 806 with other elements of the virtual purchasing system 800, described herein with reference to FIG. 8.

In another embodiment, virtual purchaser 806 includes an authentication module 821 which facilitates the authentication and/or validation of the identity and/or status of consumers who seek access to virtual purchaser 806 through a consumer terminal 802. The authentication module 821 may have access to a suitable storage device, such as database 822 for example, which maintains records identifying authorized consumers.

Referring once again to FIG. 8, virtual purchasing system 800 further includes one or more retailer systems 808. The retailer system 808 is substantially similar to, and may comprise any of the components of, retailer system 104, as described above with reference to FIGS. 1, 2, and 3. Moreover, retailer system 808 may be configured to include any of the functionality described above with reference to retailer system 104. In an exemplary embodiment, the retailer system 808 is in communication with a database 809. Database 809 is substantially similar to, and may comprise any of the components and/or functionality of, database 111, as described above. In one embodiment, database 809 stores retailer item identifiers and related data, such as item descriptions and item prices for example.

The rewards server 836 is substantially similar to, and may comprise any of the components and/or functionality of, rewards server 120 and/or 502, as described above with reference to FIGS. 2, 3, and 5. In an exemplary embodiment, the rewards server 836 is in communication with a database 837. Database 837 is substantially similar to, and may comprise any of the components and/or functionality of, database 121, as described above. Although rewards server 836 is depicted in FIG. 8 as a separate component of system 800, in an alternate embodiment of the invention, the functionality of rewards server 836 is integrated with virtual purchaser 806.

Figure 10:
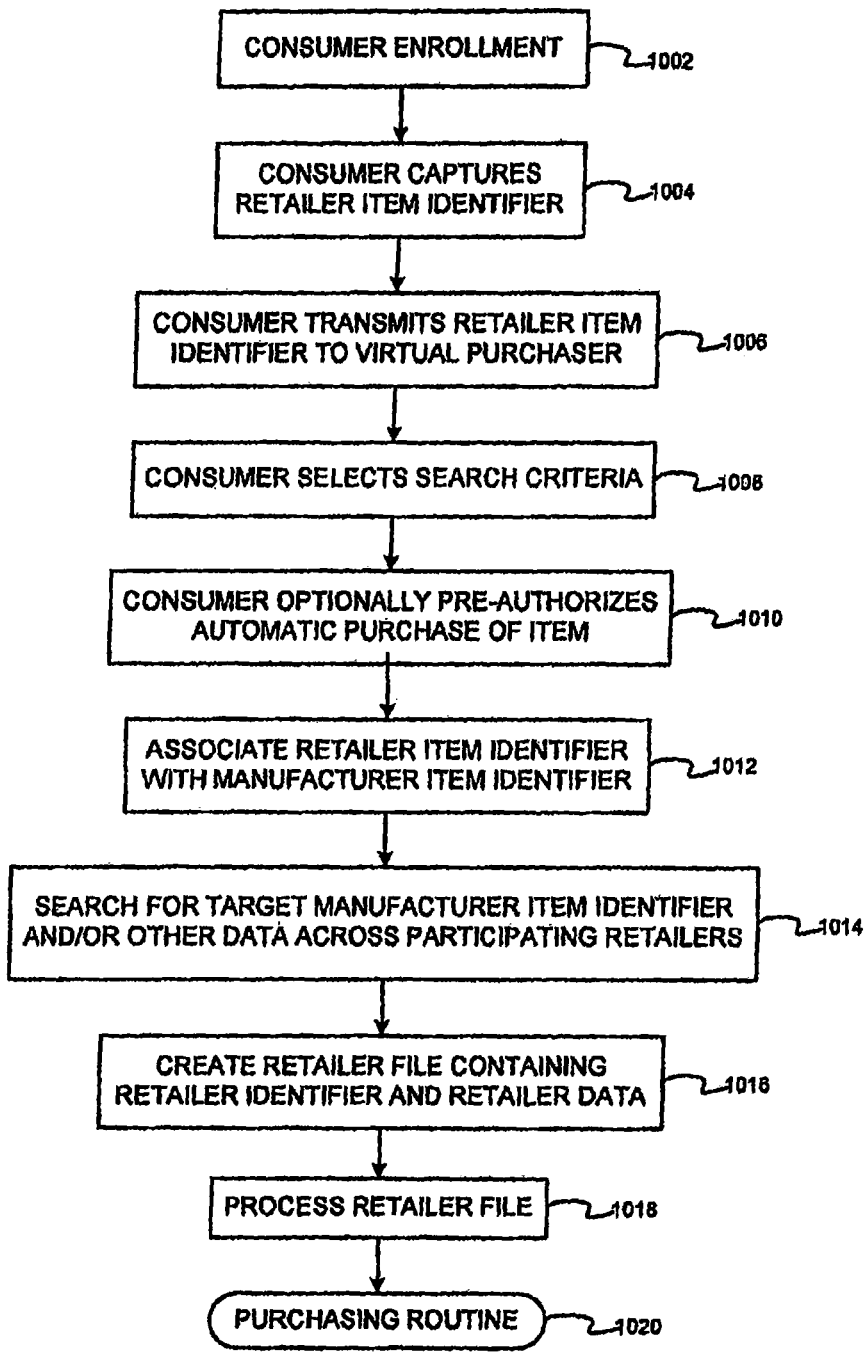
FIG. 10 is a flowchart illustrating an exemplary process for conducting a network-wide search for an item in accordance with the invention.
Figure 11:
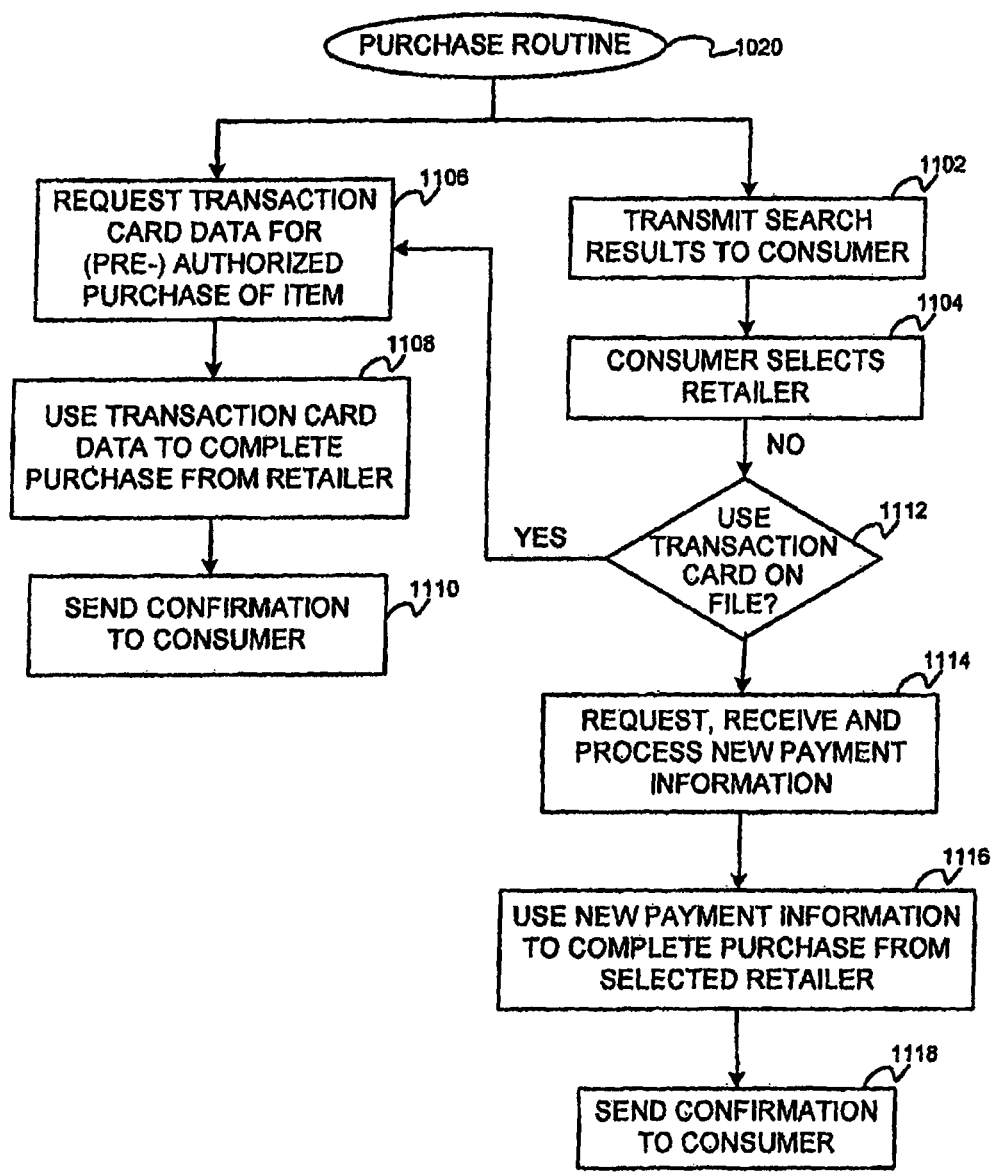
FIG. 11 is a flowchart illustrating an exemplary process for facilitating the purchase of an item located through the process of FIG. 10.

Referring next to FIGS. 10 and 11, the process flows depicted in these figures are merely exemplary embodiments of the invention and are not intended to limit the scope of the invention as described above. It will be appreciated that the following description makes appropriate reference not only to the steps depicted in FIGS. 10 and 11 but also to the various system components as described above with reference to FIGS. 8 and 9. FIG. 10 is flowchart illustrating an exemplary process for facilitating a search (for example, a network-wide search) for an item which corresponds to a given retailer item identifier. Conducting a network-wide search begins with enrolling a consumer in the system of the invention (step 1002). As described above, enrollment is accomplished by central rewards mechanism 804. That is, enrollment module 816 receives and processes the consumer enrollment data, facilitates issuance of a consumer ID to the consumer, and transmits the consumer enrollment data to storage device 818. After a consumer is enrolled in the system, the consumer may use the consumer ID when interacting with the virtual purchaser 806 and/or during a purchase transaction facilitated by virtual purchaser 806.

After a consumer has enrolled in the system of the invention, the consumer uses input device 810 to facilitate the capture, scan, read, or otherwise input of a retailer item identifier associated with an item located at a retailer store into consumer terminal 802 (step 1004). In one embodiment, the consumer terminal 802 is present at the retailer store and the retailer item identifier is input directly into consumer terminal 802. In another embodiment, input device 810 stores the retailer item identifier and then downloads the data to consumer terminal 802 at a later time. After consumer terminal 802 receives the retailer item identifier, consumer terminal 802 can facilitate establishing communications with virtual purchaser 806.

Once consumer terminal 802 contacts virtual purchaser 806, consumer terminal 802 facilitates transmission of a retailer item identifier to virtual purchaser 806 to facilitate a network-wide search for that item corresponding to the retailer item identifier (step 1006). In one embodiment, contacting virtual purchaser 806 includes using a consumer ID for identification of the consumer and/or for authorization to access the virtual purchaser 806. Once contacted, virtual purchaser 806 may request that the consumer select search criteria which virtual purchaser 806 may use to customize a network-wide search for items that correspond to the retailer item identifier transmitted by consumer terminal 802 (step 1008). In one embodiment, the requested search criteria may include any number of the following: an item description, an item price, a quantity of the item, a retailer name or identifier, a retailer location that is nearest the consumer, a consumer rating of items and/or retailers, lowest price available for the item, quickest estimated delivery time, a preferred retailer, and/or the like. In another embodiment, the consumer may select a set of master search criteria which are stored in database 822 as a default set of search criteria which is used by virtual purchaser 806 in subsequent searches requested by the consumer, unless in one embodiment the consumer overrides the master search criteria during a particular session. In this embodiment, the search criteria (i.e., master search criteria) may be selected and transmitted to the virtual purchaser 806 by the consumer prior to transmitting a particular retailer item identifier. In one embodiment, selection of consumer search criteria and/or master search criteria is facilitated by purchase module 820.

In another embodiment, the virtual purchaser 806 may permit the consumer to pre-authorize the virtual purchaser to facilitate automatic purchase of the item on behalf of the consumer, if the search results include an item which matches the consumer's specified search criteria (step 1010). In another embodiment, the virtual purchaser 806 permits the consumer to select a desired format for the search results, such as displaying all search results for the consumer or displaying some subset (e.g., retailers and/or items that exactly match the consumer's selection criteria) of the search results, for example.

After virtual purchaser 806 receives the retailer item identifier and receives any search criteria from the consumer terminal 802 (or accesses any master search criteria), the retail item identifier is translated or associated with a standard identifier, such as a manufacturer item identifier, for example (step 1012). The standard identifier can be used to search the network for the same or similar items that may be offered for sale by other retailers under different conditions and/or terms (i.e., conditions and/or terms that are perceived to be more favorable by the consumer, as determined by the search criteria).

In one embodiment, the virtual purchaser 806 facilitates transmission to the retailer item identifier and any search criteria to rewards server 836 to accomplish the association process. In this embodiment, the retailer item identifier (e.g., a SKU) is standardized to facilitate a search (e.g., local, with a category, network-wide, etc) for the item identified by the SKU. Standardization is accomplished by matching or associating the SKU information with a corresponding manufacturer item identifier (e.g., a UPC) which identifies the manufacturer of the item and/or a general description of the goods or services. Association of SKU and UPC data may be accomplished through any data association technique known and practiced in the art. For example, the association may be accomplished either manually or automatically. Automatic association techniques may be facilitated by, for example, a database search, a database merge, GREP, AGREP, SQL, and/or the like. An exemplary method for associating SKU and UPC data is described above with reference to FIG. 7.

In one embodiment, after associating the retailer item identifier with a manufacturer item identifier, rewards server 836 then uses the UPC data (target UPC) to facilitate a further search of database 837 (step 1014). This second search looks for the target UPC data across participating retailers whose data (e.g., retailer identifier, items available, descriptions of items available, item price, delivery information, and the like) is stored in database 837. As the rewards server 836 locates retailers associated with the target UPC data, rewards server 836 adds the relevant retailer identifier data, as well as any retailer data that may be relevant to the search criteria, to a retailer file (step 1016). If rewards server 836 is unable to sufficiently locate a certain number of retailers that are associated with the target UPC data (e.g., the item is not carried by other participating retailers or the item has been discontinued and is no longer carried by participating retailers), rewards server 836 may search database 837 for the item description that is associated with the target UPC data and the transmitted SKU. In this manner, rewards server 836 may locate items that are similar to the item desired by the consumer. In an alternate embodiment, depending on the search criteria provided by the consumer, rewards server 836 may conduct a search for similar items even though retailers carrying items associated with the target UPC have been located. Once the search is complete, the rewards server 836 then transmits the retailer file containing the retailer data to virtual purchaser 806. In one embodiment, virtual purchaser 806 receives and processes the retailer file in accordance with any applicable consumer search criteria, any search results formatting criteria, and/or any data relating to a pre-authorized automatic purchase of the item (step 1018).

After processing the retailer file, the virtual purchaser 806 enters a purchasing routine (step 1020). An exemplary purchasing routine is illustrated in FIG. 11. If the consumer has pre-authorized an automatic purchase, purchase module 820 affects the purchase on behalf of the consumer, as described in greater detail below. If the consumer has not pre-authorized an automatic purchase, virtual purchaser 806 transmits a list of the search results to consumer terminal 802 (step 1102). Upon receiving the search results, consumer terminal 802 may select a retailer from which the consumer wishes to purchase the requested item (step 1104).

If the consumer has pre-authorized the automatic purchase of the item, purchase module 820 facilitates the pre-authorized purchase for the consumer. In one embodiment, purchase module 820 requests transaction card information from central rewards mechanism 804 (step 1106). As described above, storage device 818 contains consumer enrollment data which includes transaction card information for the consumer. The transaction card information is transmitted from central rewards mechanism 802 to virtual purchaser 806, and purchase module 820 uses the transaction card information to complete a purchase transaction on behalf of the consumer with the retailer that satisfies the consumer's search criteria (step 1108). Once the purchase transaction is complete, virtual purchaser 806 sends a confirmation to the consumer terminal 802 indicating that the requested purchase has been made (step 1110). The confirmation may be in any suitable form, such as through an email, over the phone, or through the mail, for example, and may include any suitable information, such as information which indicates the retailer, the price, the particular item, the quantity, the delivery time frame, and/or the like.

If the consumer selects a retailer from which to purchase the item after viewing the search results, the purchase module 820 queries whether the consumer wishes to use the transaction card on file with the central rewards mechanism 804 (step 1112). If the consumer wishes to use the transaction card that is on file with the system, purchase module 820 completes the purchase transaction in the manner described above with reference to a pre-authorized purchase transaction (steps 1106 through 1110). If the consumer wishes to use an alternate method of payment, the purchase module requests, receives, and processes the new payment information (1114). Once the new payment information is received, the purchase transaction with the selected retailer is completed (step 1116), and confirmation is sent to the consumer as described above (step 1118).

In an exemplary embodiment, once the confirmation is sent to the consumer, the virtual purchaser 806 may also send an automatic reminder to the consumer as the delivery data approaches. In another embodiment, the virtual purchaser 806 may also provide automatic tracking of the shipment for the consumer.

Figure 12:
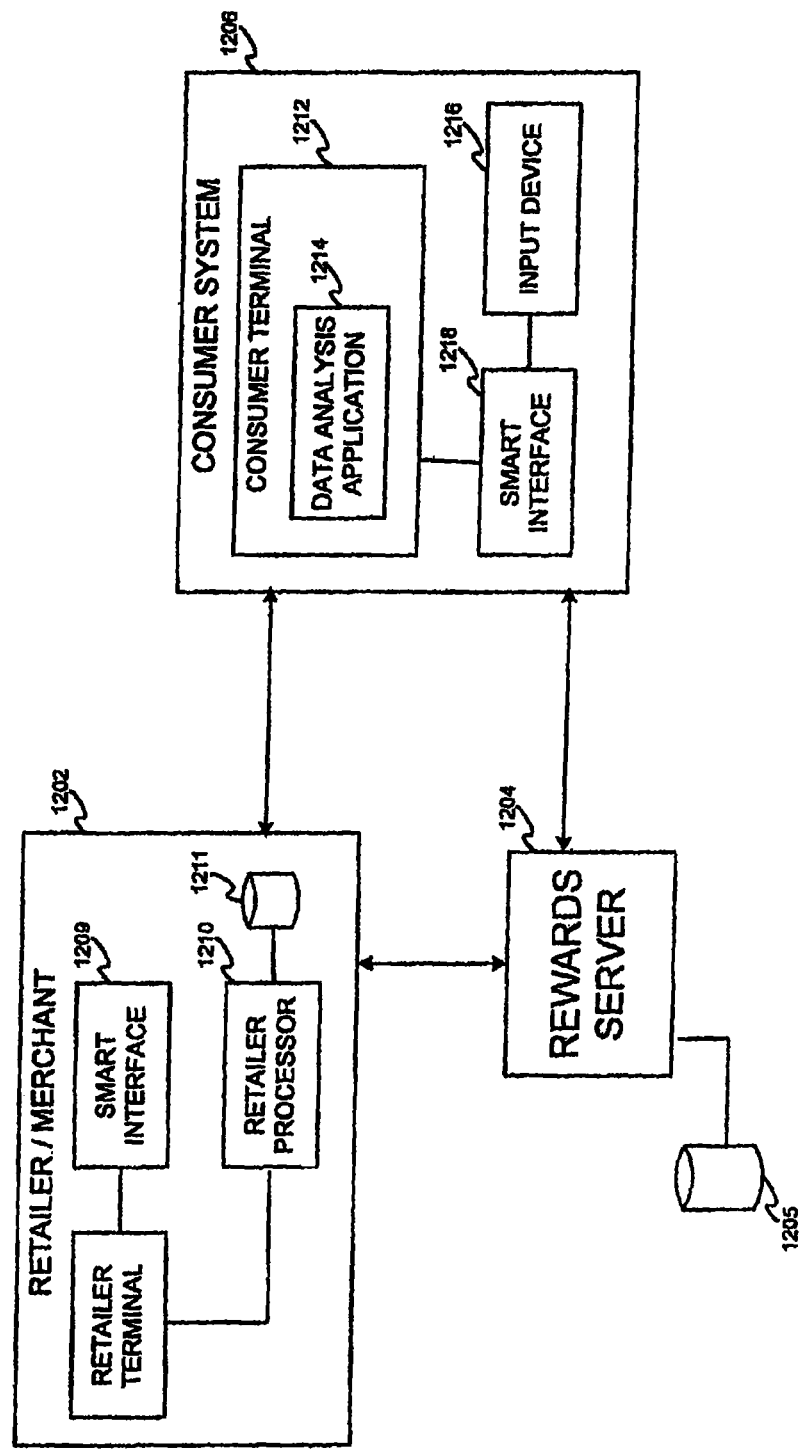
FIG. 12 is a schematic block diagram of an exemplary consumer purchasing analysis system in accordance with the invention.

In accordance with another aspect of the invention, FIG. 12 is a diagram illustrating an exemplary consumer purchasing analysis system 1200. Consumer purchasing analysis system 1200 may be used to analyze a consumer's purchasing behaviors, compare budgeted purchases with actual purchases, compare prices of various retailers, and generate reports which detail these analyses and therefore assist a consumer in managing their personal finances. The comprehensive nature of the data made available to a consumer through consumer purchasing analysis system 1200 permits network-wide, product-level knowledge of a consumer's specific purchasing patterns across retailers. The detailed tracking provided by consumer purchasing analysis system 1200 of a consumer's particular purchasing activities permits the consumer to analyze those activities and thereby achieve greater control over their personal financial situation.

In the exemplary embodiment illustrated in FIG. 12, consumer purchasing analysis system 1200 comprises a retailer/merchant system 1202, a reward server 1204, and a consumer system 1206. It will be appreciated that the system 1200 may comprise any number of retailer systems 1202 and any number of consumer systems 1206.

In an exemplary embodiment, the retailer system 1202 comprises a retailer terminal 1208, a smart interface 1209, and a retailer processor 1210. The retailer processor 1210 may be in communication with a database 1211. The retailer system 1202 is substantially similar to, and may comprise any of the components of, retailer system 104, as described above with reference to FIGS. 1-3. Moreover, retailer system 1202 may be configured to include any of the functionality described above with reference to retailer system 104. Retailer terminal 1208 is substantially similar to, and may comprise any of the components and/or functionality of, retailer terminal 108; retailer processor 1210 is substantially similar to, and may comprise any of the components and/or functionality of, retailer processor 110; and database 1211 is substantially similar to, and may comprise any of the components and/or functionality of, database 111. Smart interface 1209 is any device which is configured to interface with input device 1216. Exemplary smart interfaces include a smartcard reader, an RF reader, and an RF transceiver reader.

The rewards server 1204 is substantially similar to, and may comprise any of the components and/or functionality of, rewards server 120 and/or 502, as described above with reference to FIGS. 2, 3, and 5. In an exemplary embodiment, the rewards server 1204 is in communication with a database 1205. Database 1205 is substantially similar to, and may comprise any of the components and/or functionality of, database 121, as described above.

In an exemplary embodiment, the consumer system 1206 comprises a consumer terminal 1214 and an input device 1216. Optionally, consumer system 1206 may also include a smart interface 1218. Consumer terminal 1212 may be any remote terminal through which a consumer may access other aspects of the system 1200 and may comprise any of the input devices, computing units, or computing systems described herein. Further, consumer terminal 1212 communicates with the system 1200 through any of the communications networks described above. In an exemplary aspect, consumer terminal 1212 comprises a data analysis application 1214. Data analysis application 1214 may be any suitable application for analyzing data. Common data analysis products that may be used to implement data analysis application 1214 include Quicken® or any of the other products available from Intuit, Inc. (Mountain View, Calif.), Microsoft Money® by Microsoft Corporation (Redmond, Wash.), or any other data analysis product Smart interface 1218 is any device which is adapted to facilitate communication between input device 1216 and consumer terminal 1212 if components 1212 and 1216 are separate devices. Exemplary smart interfaces include a smartcard reader, an RF reader, and an RF transceiver reader.

Input device 1216 may be any device that is capable of receiving or uploading purchase data from a retailer system 1202. Input device 1216 may be configured to communicate the purchase data to consumer terminal 1212 in real time or some time later. Input device 1216 may be integrated with consumer terminal 1212 or may be a separate component that is adapted to communicate with consumer terminal 1212, such as through smart interface 1218. Exemplary input devices may include software, smartcards and smartcard readers, non-contact smart chip systems, read-write transponder systems, and other smart chip devices and related technology. In an exemplary aspect, input device 1216 is integrated with a consumer ID.

A number of standards have been developed to address general aspects of integrated circuit or smart cards, e.g.: *ISO 7816-1, Part 1: Physical characteristics* (1987); *ISO 7816-2, Part 2: Dimensions and location of the contacts* (1988); *ISO 7816-3, Part 3: Electronic signals and transmission protocols* (1989, Amd. 1 1992, Amd. 2 1994); *ISO 7816-4, Part 4: Inter-industry commands for interchange* (1995); *ISO 7816-5, Part 5: Numbering system and registration procedure for application identifiers* (1994, Amd. 1 1995); *ISO/IEC DIS 7816-6, Inter-industry data elements* (1995); *ISO/IEC WD 7816-7, Part 7: Enhanced inter-industry commands* (1995); and *ISO/IEC WD 7816-8, Part 8: Inter-industry security architecture* (1995). These standards are hereby incorporated by reference. Furthermore, general information regarding magnetic stripe cards and chip cards can be found in a number of standard texts, e.g., Zoreda & Oton, SMART CARDS (1994), and Rankl & Effing, SMART CARD HANDBOOK (1997), the contents of which are hereby incorporated by reference. For additional information regarding such cards, see, for example, application Ser. No. 09/522,628, filed Mar. 10, 2000, entitled "Methods and Apparatus for Authenticating the Download of Applets onto a Smartcard," which is hereby incorporated by reference. Additionally, for further information on Radio Frequency Identification (RFID) systems and their use in the context of read-write transponders, see, for example, the recently completed ISO 14443 standard, which specifies a standard form of communication for non-contact smart chips, and provisional application Ser. No. 60/304,216, filed Jul. 10, 2001, entitled "System and Method for RFID Payments", the contents of which are hereby incorporated by reference.

In an exemplary aspect, input device 1216 is a separate component of consumer system 1206 that is used to upload purchase data from a retailer system 1202 at the retailer's location and then download the purchase data to consumer terminal 1212 some time later through smart interface 1218. In one embodiment, input device 1216 includes a smartcard which is adapted to interface with retailer terminal 1208 through a smart interface 1209 that includes a smartcard reader. In another embodiment, input device 1216 includes a transponder which uses RFID to interact with smart interface 1209 without physically contacting smart interface 1209. In this embodiment, smart interface 1209 includes an RF reader or RF transceiver reader.

In another exemplary aspect, input device 1216 is integrated with consumer terminal 1212 and may be used to upload purchase data from retailer system 1202 to consumer terminal 1212 directly. In one embodiment, an integrated consumer terminal 1212 and input device 1216 may communicate with an online retailer system 1202 to receive purchase data from the online retailer system 1202. In another embodiment, consumer terminal 1212 may be a hand-held electronic device, such as a personal digital assistant, which includes an integrated input device 1216 that is configured to interact with smart interface 1209 at the retailer's location.

Figure 13:
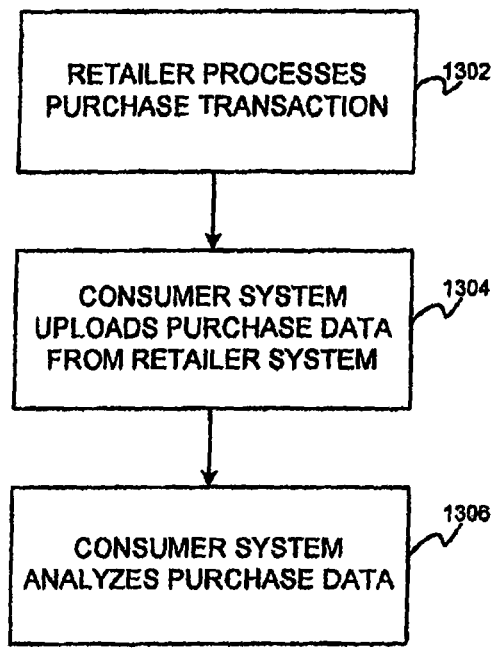
FIG. 13 is flowchart illustrating an exemplary process for obtaining a record of a consumer's purchasing activities.
Figure 14:
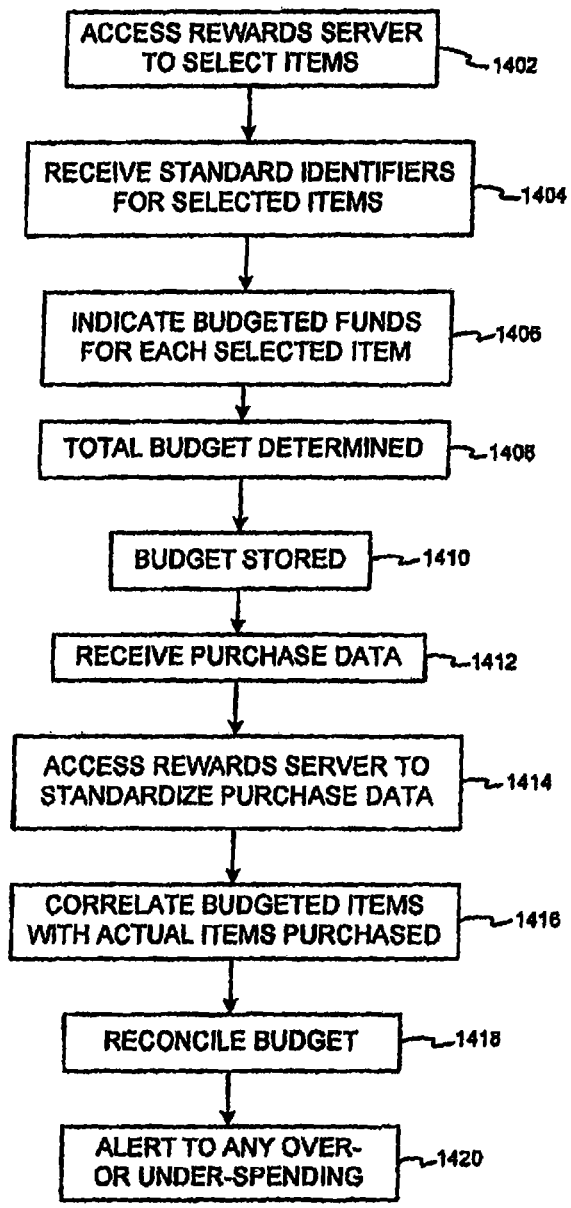
FIG. 14 is flowchart illustrating an exemplary process for analyzing a consumer's purchasing activities.

Referring next to FIGS. 13 and 14, the process flows depicted in these figures are merely exemplary embodiments of the invention and are not intended to limit the scope of the invention as described above. It will be appreciated that the following description makes appropriate reference not only to the steps depicted in FIGS. 13 and 14 but also to the various system components as described above with reference to FIG. 12.

FIG. 13 is flowchart illustrating an exemplary process for facilitating obtaining a record of a consumer's purchasing activities. Analyzing a consumer's purchasing activities may begin when a retailer terminal 1208 processes and records a consumer purchase transaction, either online (such as at a merchant web site for example) or off-line (such as at a retailer store for example) (step 1302). The consumer purchase transaction generates purchase data, such as any of the purchase data described above. In one embodiment, the purchase data may include a retailer item identifier, a retailer ID, and an item price. The consumer system 1206 receives (e.g., uploads) the purchase data from retailer system 1202 via input device 1216 (step 1304). The consumer system then analyzes the purchase data using data analysis application 1214 (step 1306).

FIG. 14 is a flowchart illustrating an exemplary process for analyzing a consumer's purchasing activities. In an exemplary aspect, consumer system 1206 communicates with rewards server 1204 to standardize the data used by data analysis application 1214. In one embodiment, a consumer communicates with rewards server 1204 while the consumer uses data analysis application 1214 to prepare a budget. The consumer accesses rewards server 1204 to select the various items that the consumer intends to purchase over the budget period (step 1402). The budget period may be for any predetermined period of time, such as a week, a month, six month, a year, etc.

In one embodiment, the rewards server 1204 facilitates item selection by designating items by product category (e.g., clothes, electronics, sports equipment, etc.) or by specific product (e.g., jeans, stereo, bicycle, etc.), including specific products by particular manufacturers. For each item selected by the consumer, rewards server 1204 transmits an appropriate standard identifier to consumer terminal 1212 (step 1404). If a consumer designates a selected item by product category, the rewards server 1204 transmits a standard identifier that corresponds to a product category that is associated with the retailer ID of retailers who sell items in that product category. If a consumer designates a selected item by specific product, the rewards server 1204 transmits a manufacturer item identifier (e.g., UPC) that corresponds to that specific product. The consumer then completes the budgeting process by indicating the amount of funds that the consumer intends to spend on each of the selected items (i.e., budgeted funds) (step 1406). The data analysis application 1214 then determines an amount of funds that corresponds to the total budget for the budget period (step 1408), and the established budget is stored by consumer terminal 1212 (step 1410). The consumer system 1206 may terminate the session with the rewards server 1204 any time after receiving the appropriate standard identifiers.

After the budget is established and stored by consumer terminal 1212, the consumer uses input device 1216 to transmit purchase data to consumer terminal 1212 (step 1412). In an exemplary embodiment, after the purchase data is transmitted to consumer terminal 1212, consumer system 1206 communicates with rewards server 1204 to standardize the purchase data (step 1414). Standardization of the purchase data may include facilitating the conversion of retailer item identifiers (e.g., SKUs) to manufacturer item identifiers (e.g., UPCs) to facilitate the reconciliation of actual purchases with the established budget. The conversion or association of SKU and UPC data is described above with reference to FIG. 7. After the purchase data is standardized and consumer terminal 1212 receives the appropriate standard identifiers, the purchase data is analyzed by data analysis application 1214.

In one aspect of the analysis, budgeted items and actual items are correlated with each other based upon the standard identifiers (step 1416). That is, a budgeted item that is designated by product category is correlated with an actual item that is associated with a retailer ID that corresponds to the appropriate product category. Likewise, a budgeted item that is designated by specific product is correlated with an actual item that is associated with a UPC that corresponds to that specific product. In one embodiment, the analysis performed by data analysis application 1214 may include a comparison of the established budget to actual purchase activity and/or a real-time or periodic reconciliation of budgeted items with actually purchased items (step 1418). A budget reconciliation may include displaying or printing a comparison of budgeted items and/or budgeted funds with actually purchased items and/or actual funds spent for a selected period (e.g., the budget period or any period within the budget period). In another embodiment, the analysis may include actual or projected cash flow analyses based upon the actual funds spent in a given period, for example.

In one embodiment, the analysis may include an alert when a budget reconciliation determines that over- or under-spending has occurred, including when over- or under-spending occurs in specific product categories or for specific products (step 1420). In this context, under-spending means that budgeted funds have not yet been spent. Moreover, the budget reconciliation includes a pre-set percentage or amount has been spent or not been spent in a category or over a set number of categories. In one embodiment, the consumer is alerted by consumer terminal 1212. In another embodiment, the consumer system 1206 transmits an alert to a third-party, such as a financial advisor for example. In an embodiment, system 1 automatically calculates average spending in any category and creates a budget (or modifies an existing budget). This function enables the user to, for example, compare spending year-to-year or month-to-month, rollover extra cash each month, etc. In one embodiment, system 1 includes budget analysis tools that, for example, identify a couple of categories where a user may want to cut back. The user may enter a budget amount for a category (or a number of categories) and system 1 sends alert to empower the user with information to keep them on track with budget goals.

In general, the invention also includes a system and method which facilitates the transfer of all or any portion of user income to a user account 20 and user savings account 23 based upon a hierarchical based or rules based system. The invention also allocates and transfers a portion of the user income to other accounts (e.g., payee bills or debts) based upon other hierarchies and rules, wherein the host 5 may transfer a portion of the user income from user account 20 to a user savings account 23 ("pay yourself") first before paying all or a certain portion of the user debts. In one embodiment, the invention includes complex hardware and software to analyze income sources and savings goals before transferring the consumer income to an automatic bill payment system. As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The user income, as used herein, may include any monetary or non-monetary income, asset or benefit related to the user, wherein the income may be obtained from an income source of the user (e.g., employer) or any other third party. The user income may include paycheck, salary, bonuses, commissions, purchase rebate, tax rebates, property, goods, social security, welfare, alimony, child support, rental income, securities-related income, gambling winnings, credits, loyalty points, reward points, coupons, entry passes and/or the like. In an embodiment, the system obtains real estate value data (e.g., from tax records or from a third party data provider) in order to track, adjust and report on the value of assets (e.g. real estate).

User debts, as used herein, include any monetary or non-monetary liability of the user or any other third party (e.g., user may be obligated or desire to pay off the debt of a relative, company or associate). The debts may be related to bills (e.g., utilities, cable television, phone, etc), car payments, loans, mortgages, purchases, voluntary payments (e.g., charitable or religious donations), alimony, child support, payment plans, lines of credit, financial losses, gambling losses, responsibilities and/or the like.

Figure 15:
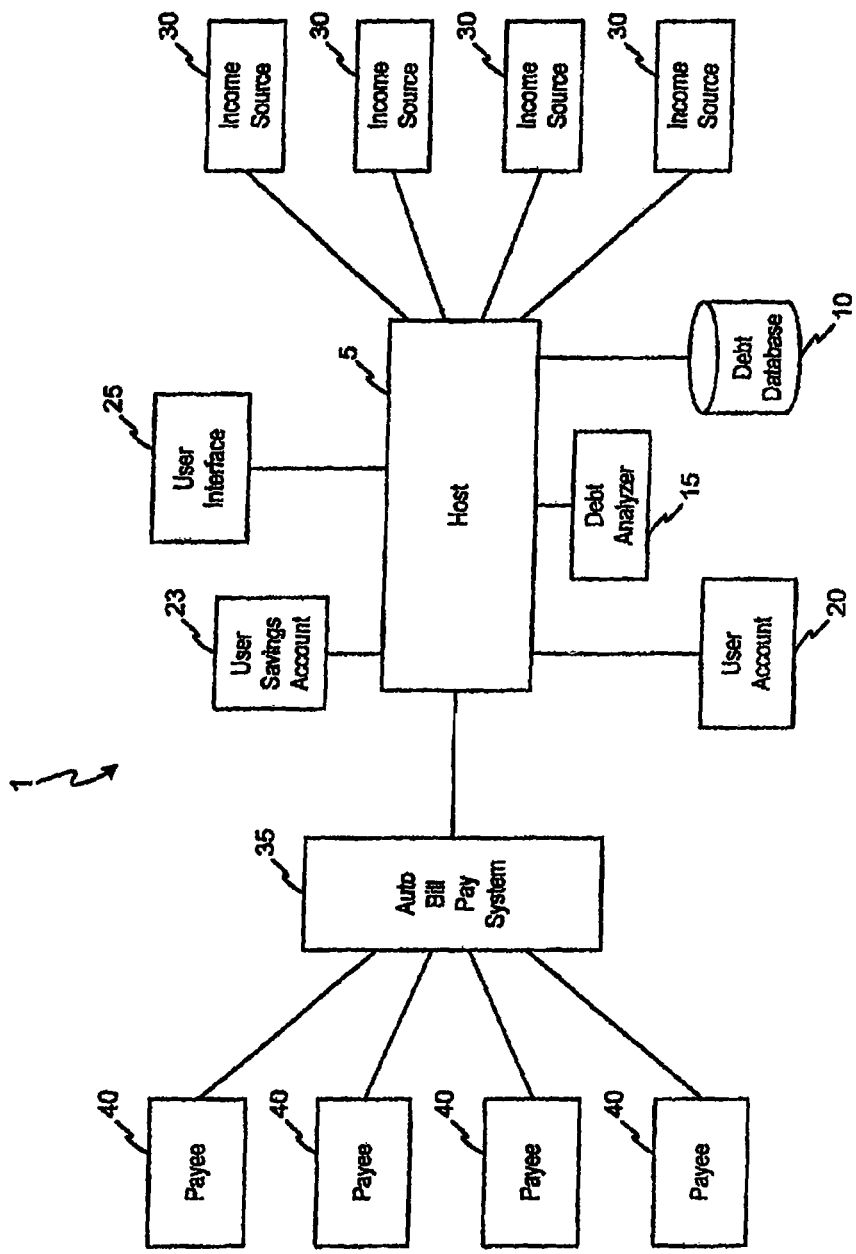
FIG. 15 is a block diagram showing an exemplary embodiment of a system in accordance with the present invention; and, FIG. 16 is a flow chart showing an exemplary embodiment of a method for implementing the present invention.

An exemplary system 1 according to one embodiment, and as set forth in FIG. 15, may include one or more host 5, user account 20, user savings account 23, user interface 25, income source 30 and payee 40. The system may also include or interface with an automatic bill payment system 35. For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Moreover, one skilled in the art will appreciate that, for security reasons, any databases, systems, devices, servers or other components of the present invention may consist of any combination thereof at a single location or at multiple locations, wherein each database or system includes any of various suitable security features, such as, for example, firewalls, access codes, encryption, decryption, compression, decompression, and/or the like.

Host 5 may include any hardware and/or software suitably configured to facilitate management of user income and/or user income sources. Host 5 may interface, directly or indirectly, with user account 20, user interface 25, income sources 30, automatic bill payment system 35, and/or payees 40. Host 5 may acquire information, funds or any other data from income sources 30 and transfer the funds into user account 20. Host may also acquire information from payees 40 and/or transfer funds to payees 40 (e.g., directly or via automatic bill payment system 35). Host may also include debt analyzer 15 and debt database 10. Host 5 may also allow the user to track user spending, payments and income received. Host 5 may also allow the user to import such data from another system or database (e.g., security broker database, charge card database), for the purpose of helping the user to estimate income, bill amounts, the dates when such income will be received or when such bills will come due. Host 5 may also allow user to utilize user interface 25 to access not only the features of system 1, but also personal financial accounting system features and information. In this regard, the system may also be integrated with any personal financial or accounting system, such as Quicken or any financial advice software.

Debt database 10 may include any hardware and/or software suitably configured to facilitate storing debt information. The debt information may include, for example, payee account numbers, payee names, bill due dates, minimum payment information, penalty information, interest information, credit rating information, payee rules and restrictions, and/or the like. In an embodiment, debt database 10 seamlessly consolidates all, or a substantial portion, of a user's financial accounts to provide an accurate wealth snapshot. Debt analyzer 15 may include any hardware and/or software suitably configured to facilitate analysis of the debt information and/or to determine a suggested hierarchy of debts. The debt analyzer 15 may obtain information from a personal financial or accounting system in order to provide additional recommendations which conform at least partially to the suggestions or restrictions of the financial or accounting software.

User account 20 may include any hardware and/or software suitably configured to facilitate storing user income and/or user income information. The user income information may include, for example, income source data, date of deposit or receipt, amounts owed from particular income sources, amounts deposited in the user savings account 23, dates of deposits in user savings account 23 and/or the like.

User savings account 23 may include any hardware and/or software suitably configured to facilitate storing income, wherein the income may not have yet been allocated to payees 40. User savings account 23 may include, for example, any financial account (e.g., savings, checking, money market), loyalty account, security, financial transaction instrument (e.g., stored value card, charge card, smart card, transponder), negotiable instrument, coupon and/or the like. In an exemplary embodiment, the account does not easily allow for withdrawals (i.e., has no check-writing privileges, banking or checking card features which facilitate easy withdrawals).

A user may include any individual, business, entity, government organization, software and/or hardware that interact with a system. User interface 25 or web client may include any hardware and/or software suitably configured to facilitate input, receipt and/or review of any information related to system 1 or any information discussed herein. User interface 25 or web client includes any device (e.g., personal computer, mobile device, phone, etc.) which communicates via any network, for example such as those discussed herein. Browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, mobile phones, mobile devices, set-top boxes, workstations, computer-servers, main frame computers, mini-computers, PC servers, pervasive computers, network sets of computers, and/or the like. Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

Automatic bill payment system 35 may include any hardware and/or software suitably configured to facilitate acquiring bill information and/or payment of bills. Automatic bill payment system 35 may include known bill payment systems such as, for example, the systems offered by Yahoo Bill Pay, Checkfree, PayBills, PayPal, etc. Automatic bill payment system 35 may facilitate the payment of bills on or near the due date. Because paying some bills past the due date may substantially affect the user's credit rating, system 1 may incorporate an on-line bill payment system 35 to mitigate the late payment risk. Accordingly, in one embodiment, the system includes an automatic bill payment system 35 or other on-line billing feature that allows the user to select bills to be paid on-line and the date in which the bills are to be paid.

Payees 40 may include one or more person or entity which is owed money. Payees 40 may provide or allow access to debt information from host 5 directly or via automatic bill payment system 35. Payee may also include, for example, one or more person, entity, organization, software, hardware, charity, utility, mortgage company and/or the like. Similarly, user may include, for example, one or more person, entity, company, charity, organization, software, hardware, and/or the like.

The various system components discussed herein may include one or more of the following: a server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user data, debt data, income data, merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. user computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components—may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction' instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Intervase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the interne. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

Each user, income source, host, payee or other participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the invention. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The computers may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Examplary transaction networks may include the American Express®, VisaNet® and the Veriphone® networks.

An "account" or "account number", as used herein, may include any device, code, number, letter, symbol, digital certificate, smart chip, digital signal, analog signal, biometric or other identifier/indicia suitably configured to allow the user to access, interact with or communicate with the system such as, for example, one or more of an authorization/access code, personal identification number (PIN), Internet code, other identification code, and/or the like which may optionally be located on or associated with a rewards card, charge card, credit card, debit card, prepaid card, telephone card, smart card, magnetic stripe card, bar code card, transponder, radio frequency card or an associated account. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the customer. A merchant account number may be, for example, any number or alpha-numeric characters that identifies a particular merchant for purposes of card acceptance, account reconciliation, reporting, or the like.

The invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Figure 16:
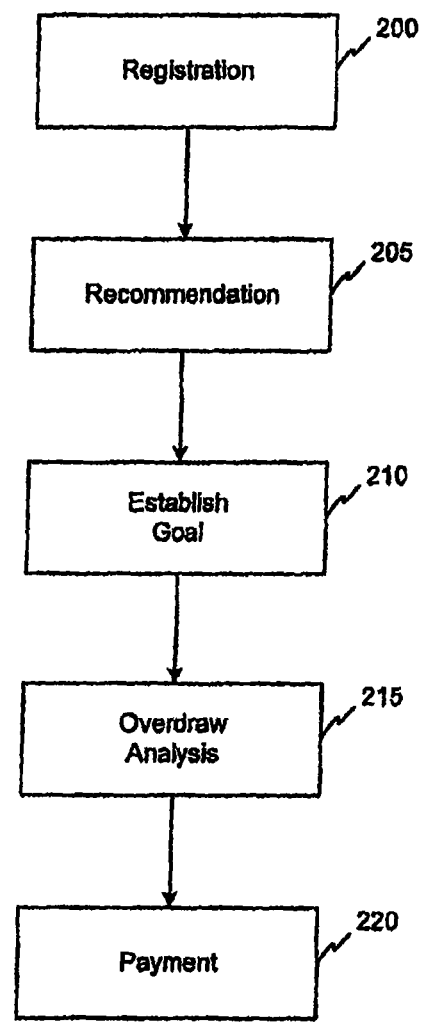

In one embodiment, the foregoing exemplary system may be used in the present invention to perform the following method. The exemplary method may include, as set forth in FIG. 16, a registration phase (step 200), a recommendation phase (step 205), a goal establishment phase (step 210), an overdraw analysis phase (step 215) and a payment phase (step 220).

The registration phase (step 200) may include a user providing and system receiving financial information. The user may provide the information via any network or communication system discussed herein. In one embodiment, host 5 provides a web page within a website which is hosted at a server, wherein the webpage facilitates obtaining personal financial information from the user by, for example, menu driven interactive procedures. In an embodiment, a web page seamlessly presents (e.g., via a dashboard) a user's financial accounts to provide an accurate wealth snapshot. The user may use user interface 25 to enter into a web page the requested financial information, wherein the financial information may include, for example, user income information, user income source information, user savings goal information, and user debt information.

The user income source information may include any information related to user income such as, for example, income source demographic data, income source routing data (e.g., to facilitate the funds being deposited within user account 20), amount of income during a particular timeframe (e.g., bi-monthly), bonus information (e.g., amount and time of year received), tax refund information, estimated commission information and/or the like. As set forth above, the user income may include any monetary or non-monetary income, asset or benefit related to the user, wherein the income may be obtained from an income source of the user (e.g., employer) or any other third party. The user income may include paycheck, salary, bonuses, commissions, purchase rebate, tax rebates, property, goods, social security, welfare, alimony, child support, rental income, securities-related income, gambling winnings, credits, loyalty points, reward points, coupons and/or the like. The user may also be requested to identify the days of the month in which such user income is received and the amounts of such income. If the user receives any or all income at random times (i.e. "not periodically"), then the user may estimate the amounts of such non-periodic income and indicate when such non-periodic income will be received. Host 5 may store the user income and user income source information in user account database 20.

The user income may also include additional funds submitted by the user or any other third party to system 1 in order to supplement user account 20 or user savings account 23. For example, the user may submit extra funds with a bill payment such as a single check or money transfer for both host charge card purchases and for deposit of money into user savings account 23. When the user payment is received by the host or charge card administrator, the payment processing system determines, based on the user goals, how each of the user's payments should be allocated between charge card payments and user savings account 23, namely through the use of a payment hierarchy which includes a predetermined set of allocation rules. The host or charge card administrator's payment processing system may then electronically forward the appropriate savings amount to user saving account 23 based upon another payment hierarchy related to the allocation of savings funds among savings, debts or investment products. For additional information related to submitting additional funds to the system, see for example, U.S. Ser. No. 09/415,632 filed on Oct. 12, 1999 by inventors Crane, et al. and entitled SYSTEM AND METHOD FOR DIVIDING A REMITTANCE AND DISTRIBUTING A PORTION OF THE FUNDS TO MULTIPLE INVESTMENT PRODUCTS, which is hereby incorporated by reference.

The user goal information may include the amounts the user desires to pay himself, any other financial amount, limit, milestone, threshold, objective, aspiration and/or the like. For example, an amount of money needed for a vacation, a major purchase (e.g., house or car), holiday gifts, education, or retirement. The amount may be a one-time total amount, a pre-established amount for a limited time period or continuing time period, or a periodic amount which may result in a total savings by a certain date (e.g., $10,000 by June 15 of the following year for his daughter's wedding). The goal may also include a common goal for a group of people such as, for example, a group vacation, annual family function, charitable event or fundraiser and/or the like. The user goal may be entered by the user, randomly generated, based on a increasing or decreasing amount, created using a formula, selected by system 1 and/or selected by a third party (e.g., parent, financial advisor, etc). The system 1 may store the user goal information in user account database 20. The user may use the goal information for his own savings activities or the user may be provided the option to set up user savings account 23, wherein the system allocates a portion of the user income to user savings account 23. Because many individuals often think of saving money based on how much they will have after paying bills, the invention attempts to overcome this attitude, in an exemplary embodiment, by prompting the user for the user savings goal information before entering user debt information, so that the user is aggressive in the effort to pay himself first. Similarly, the user is prompted to enter the user goal information before entering income amounts, so that the user will be aggressive in setting the user goal information.

In an embodiment, system 1 is configured to assemble various user interfaces (e.g. web pages) for the user. System 1 may employ static or dynamic user interfaces. The dynamic interfaces may be created based upon stored data, external data, predetermined rules, in response to user input, or any other method known in the art for determining the structure and content of user interfaces or for assembling user interfaces. In an embodiment, system 1 guarantees or ensures that the user takes a step to pay themselves first before allotting resources (e.g., income) for debt obligations (e.g., expenses, bills, liabilities, loans, promises to pay, etc). Thus, the system may operate in a variety of modes to enable this functionality. In one embodiment, system 1 is configured with a plurality of modes (e.g., a strict mode, a less strict mode and an easy mode) that enforce rules associated with the user's actions.

In an embodiment, a "strict" mode employs logic (e.g., predetermined rules, data validation, verification steps, etc.) to govern the user's ability to execute some of the system 1 functions. In an exemplary strict mode, after entering a savings goal, but before entering expenses, the user may not be able to step through the data entry section unless certain key steps and data are validated. An example of such validation includes validating that a transfer of a savings amount occurred (e.g., an amount that is associated with the user savings goal information) or an amount was set aside for savings. In one embodiment, system 1 verifies a transfer of funds to a user savings account. In a "less strict" mode, the user may enter a savings amount, set aside and/or provide "from" and "to" account names associated with a transfer of the savings amount to a user savings account. In "easy mode," in response to the user entering user savings goal information, the user is given a warning that he/she should immediately make a transfer in a designated amount and the user may be informed that such a transfer will help increase the likelihood that the user will meet the savings goal (i.e., user savings goal information) that the user has established.

A verification may be requested by system 1 in any mode, but in one embodiment, a verification is requested in a "strict mode." system 1 may receive a verification from a third party that funds have been set aside, and in one embodiment, the system receives an electronic verification that a savings amount has been deposited in a user savings account. For example, the system may receive a message (e.g., via email, XML or short message service (SMS)) confirming that a transaction has taken place or providing a summary of completed transactions. An example of a "third party" may include a person or entity that is registered with, rated by, verified by, listed by or otherwise associated with system 1, a banking or government institution, a non-profit or foundation, or any other entity associated with encouraging user savings. Such a third party may be referred to as a "trusted friend" and the trusted friend reviews a verification of a transfer. The user interface may provide an interface for the trusted friend to review verification information and provide their approval. In one embodiment, the user may receive an authorization key, code or number from the trusted friend and may enter the authorization key in the user interface in order to enable moving on to a next step in the process (e.g., determining a payment hierarchy associated with outstanding debt obligations) or enabling additional functionality.

Electronic verification may be received from a financial institution, a bank, transaction account issuer, or any other entity. The electronic verification may be received by the system in any format known in the art for verifying financial or electronic transactions. A trigger in system 1 may initiate savings being set aside and/or transferred. For example, the trigger may occur in response to user input, or be based upon a time, a date, an event (e.g., receiving a paycheck), etc.

In an embodiment, system 1 provides user interfaces to allow maximum flexibility for the user to enter savings goal information. For example, the user could enter a goal of $5 per day, or $30 per month or $1000 a year. The user interface and/or system 1 may execute logic to perform a conversion of the user input into user savings goal information. For example, if the user enters $5 per day as a savings goal, the system may determine that it may not be efficient or cost-effective to transfer $5 each day. Instead, system 1 may perform a conversion and prompt the user if a $70 transfer every 2 weeks is adequate (14 days×$5) or if $140 (28 days×$5) is an acceptable user savings goal. Furthermore, system 1 and/or the user interface may be configured such that user input can easily be converted into amounts that can be sent with other information (user name, user checking account, routing number, etc.) to trigger the actual transfer of funds. In an embodiment, upon the user's acceptance of the user savings goal information, the appropriate amount and other information (name, checking account, routing number etc.) are transmitted to effectuate the transfer of funds and an electronic verification is obtained.

The user debt information includes any information related to user debts such as, for example, bills, name and address of payees 40, payee account routing information, amount of bills, minimum amounts due, due date, periodic payment plan information and/or the like. As set forth above, user debts may include any monetary or non-monetary liability of the user or any other third party. The debts or debt obligations may be related to bills, car payments, loans, mortgages, purchases, voluntary payments, alimony, child support, payment plans, lines of credit, financial losses, gambling losses, responsibilities and/or the like. The user debts may also include any amount that the user regularly pays as part of his living expenses and any other amounts that the user pays from time to time, or expects to pay.

In an embodiment, system 1 is configured with functionality to receive debt information and parse the debt information (e.g., parse an electronic or paper document) in order to determine various parameters associated with a debt obligation (e.g., amount owed, terms of payments, and late/partial payment terms, interest, penalties and fees). This automation greatly enhances the convenience and accuracy of receiving user debt information into system 1, while minimizing or eliminating the need for the user to input data (which may cause the user to reduce his use of the system). For example, the user may establish a relationship with a new payee (e.g., cable television provider, power company, mortgage provider, ex-wife, etc.). The user may receive a bill (e.g., user registration information, user account information, statement of account, bill, invoice) from the payee that provides information regarding the debt (e.g., payment amounts, payment due dates, penalties, payment terms, fees, etc.). In an embodiment, the user may fax, mail or scan a bill and submit it to system 1 and/or system 1 may receive a paper or electronic bill (e.g. in optical character recognition, XML or electronic data interchange format) from a third party (on behalf of the user).

The parsing may involve, for example, optical character recognition of the data on the document, downloading data from a document or other data scrapping method, and then storing the results as data text in a database. System 1 may also receive the billing data from a third party or the user. If system 1 receives a paper or electronic bill, system 1 executes logic to electronically read the information within the bill, then parse, translate and interpret the parsed data. The data may then be stored by system 1 in debt database 10. The data obtained from the document (e.g., via parsing) includes, for example, user account number, a first debt obligation, payee information, terms and conditions associated with a first debt obligation, penalties associated with a first debt obligation, payment timing, a payment due date, payment amount, debt amount, term of debt, late payment terms, late payment interest, late payment penalties, late payment fees, partial payment terms, partial payment interest, partial payment penalties, and/or partial payment fees.

Some bills are paid on a regular, periodic basis (monthly) and have predetermined amounts (e.g. a monthly auto payment of $300; a quarterly insurance payment of $200.00). Other bills may arrive more randomly and/or in non-fixed amounts, but the bills may be anticipated with reasonable accuracy (e.g. health expenses, tax payments, auto and home maintenance, or unexpected events). For both periodic and non-periodic bills, the user may enter the day, the month and the due date which is the day he expects such bills to become due. The due date should not to be confused with the date the bill is received, because the due date represents the last possible day for bills to be paid in order to avoid certain penalties.

The recommendation phase (step 205) may include, in one embodiment, debt analyzer 15 of system 1 reviewing the user debt information in debt database 10 to provide recommendations related to the prioritization or hierarchy for paying certain bills, the amount to pay for each bill and the user goal. The recommendations may be based upon, for example, user savings goal information, user debt information (e.g., minimum amounts due, due dates) and available user income. An exemplary embodiment includes periodic income (e.g., employment income) in such an analysis because periodic income is often the easiest way to determine the optimal savings goals. For example, if the user is paid (after deductions) $500.00 a week from an employer, then the system 1 may prompt the user to pay himself some portion of that $500.00 (e.g., $100.00) before the analysis of the recommendation phase commences. In another embodiment, the system may also incorporate randomly received income (e.g., a user may pay first to himself 10% of any tax refund or other non-routine income).

In addition to savings suggestions, the system may provide the user with recommendations for prioritizing payment of bills so that the user may determine when and how much to pay himself. For example, the system may determine from the debt information a plurality of debt obligations and for at least a subset of the debt obligations, the system may determine penalties and/or fees associated with the debt obligation. For each debt obligation, it may be possible to determine multiple penalties or fees. For instance, a bill may be associated with a fee if a minimum payment is not made by a particular date, the same bill may be associated with a first penalty if no payment is made and may be associated with a second penalty if the payment amount is not within a certain percentage (e.g., minimum payment amount) of the amount due.

In an embodiment, the system analyzes the plurality of penalties in order to determine a payment hierarchy that minimizes the overall (or cumulative) penalties associated with the user debts. Penalties may include monetary penalties but may also include social or legal penalties (e.g., jail time associated with not paying child support). In an embodiment, system 1 may use forecasting and/or simulation techniques in order to predict penalties and/or assign a monetary value (or other objective measure) to a non-monetary penalty.

In an embodiment, the system may recommend prioritizing bills to be paid in the following order from highest priority to lowest priority: (i) Bills that are for essentials (e.g., food, transportation to work and school, necessary job-related expenditures, necessary education-related expenditures); (ii) Bills that affect credit rating the most; (iii) Bills that have high penalties for late payments; and, (iv) Bills that are for non-essentials. The system may also provide recommendations for partial payments of bills, where the recommendations are directly related to helping the user meet the user goal. For example, if a user has an income of $500.00, and the user wants to save $400.00, but the user has a credit card bill with a minimum due of $50.00 and a total balance of $500.00, the program may recommend that the user submits a payment that allows the user to meet his user goal, while avoiding a large penalty (e.g., do not pay less than the minimum due, but not any larger amount).

In further embodiments, the system 1 may allow the user to select a passive "recommendation" mode or an active "automatic mode". In the passive recommendation mode, the debt analyzer 15 provides recommendations to the user such as, for example, the amounts to pay himself, when the payments to the user savings account 23 will be made, the order in which bills should be paid and the amounts to be paid toward the bills. In the automatic mode, the debt analyzer 15 provides recommendations to the user initially, but upon the user accepting or revising the recommendations, the system 1 automatically transfers the payment to the user savings account 23 and to the payment of bills. A partial automatic mode may also allow the user to choose actions to take place automatically, while other actions may require approval by the user after a recommendation is made by the program. For example, in the partial automatic mode, the user may allow the program to automatically direct a payment to the user savings account 23, while requiring the system to provide a recommendation and waiting for user approval before paying certain bills.

In another embodiment, the debt analyzer 15 may recommend that the user pay himself first, but only after funds become available in user account 20. In another embodiment, the system, on a certain date and/or upon a certain level of user income being transferred to user account 20, automatically transfers a payment from user account 20 to the user savings account 23. The system may also allow the user to set his own payment criteria (in addition to pre-established options) or override the order in which debt analyzer recommends that certain bills are to be paid. For example, the system may determine that bills for essentials (e.g., transportation) are given priority over bills that affect credit rating. The user, however, may determine that bills that affect his credit rating are more important than bills for transportation to work. If the user determines that he can walk to work instead of driving or using a mass mode of transportation, then the user may choose to provide bills that affect credit rating priority over such transportation bills. Thus, the system, based upon the user's criteria or override, may recommend paying bills in an order that gives priority to bills that affect credit rating over transportation bills. The system may also "learn" the user's preferences over time by analyzing the user's inputs and override suggestions such that debt analyzer 15 may provide recommendations that more appropriately conform to more common user inputs and override requests.

In another embodiment, system 1 may help the user determine if a goal is possible or realistic within a particular timeframe. For example, if the user wants to save $10,000 in one year to obtain a new car, the system (possibly in conjunction with financial management software) may analyze the user's income sources 30 and provide the recommendation that the user should change the goal completion date to two years or the user should obtain additional income sources. In this mariner, the user is more likely to reach certain goals and continue to utilize system 1. Similarly, the system may help the user not only set current goals, but also to determine future goal amounts. For example, a user may set a goal during the current year to buy a new sports car, but in future years, the user's child may need to attend college or get married, so the user's savings goal may need to increase. As such, system 1 may calculate the amount of savings needed over various years to meet the current and future goals, wherein the savings may be calculated as an equal amount over the years or the savings may be calculated as an increasing amount to correspond to projected increased income over the years.

In an exemplary embodiment, the system may also provide probability modeling which facilitates financial advising and planning. A portfolio integration module may facilitate integration of at least one of a user's goals, assets, savings, and risk tolerance in analyzing and developing a customized strategy for financial planning of the user. A portfolio reconciler module may communicate with the portfolio integration module to facilitate comparison of the customized strategy to other strategies and projected financial decisions in order to further facilitate the user meeting the user goals. A stochastic modeling module in communication with the portfolio integration module and the portfolio reconciler module may use data from the portfolio integration module and/or the portfolio reconciler module in a stochastic modeling analysis to facilitate creation of a proposed situation portfolio for the user. The stochastic modeling module may use a synchronous stationary bootstrap method of statistical sampling to facilitate analysis of historical economic data in order to facilitate creation of the proposed situation portfolio. A simulator module in communication with the portfolio integration module and the stochastic modeling module may forecast the effects of changes to the probability modeling system and to monitor and test the system over a predetermined amount of time. For additional information related to financial management systems and methods, see for example, U.S. Pat. No. 5,819,263, issued on Oct. 6, 1998 by inventors Bromley, et al. and entitled FINANCIAL PLANNING SYSTEM INCORPORATING RELATIONSHIP AND GROUP MANAGEMENT; U.S. Pat. No. 6,430,542 issued on Aug. 6, 2002 and entitled COMPUTER-IMPLEMENTED PROGRAM FOR FINANCIAL PLANNING AND ADVISE SYSTEM; U.S. Ser. No. 10/210,827 entitled SYSTEM AND METHOD FOR FINANCIAL PLANNING AND ADVICE which was filed on Jul. 31, 2002; and, U.S. Ser. No. 09/712,743, entitled SYSTEM AND METHOD FOR CREATING FINANCIAL ADVISE APPLICATIONS, filed Nov. 14, 2000, all of which are hereby incorporated by reference.

The goal establishment phase (step 210) may include the system and/or the user determining a payment hierarchy which may include transferring funds to the user's savings account 23 prior to paying all or a portion of certain bills. In this regard, the user determines "when" to pay himself based on the suggested recommendations and ranking. Using the example hierarchy above, one user may choose to transfer funds to user savings account 23 after paying bills that affect credit rating, but before bills with high penalties for late payment. However, another user may receive a similar recommended hierarchy list and request that the system transfer funds to user savings account 23 before paying bills in any of the categories set forth in the hierarchy listing.

The system may also not only pay (or encourage the user to pay) the user first (or in a priority position), but the system may transfer funds to the user savings account 23 first in the largest amounts possible. For example, if the user receives an electric bill on the fifteenth of the month that is not due until the first of the next month, the system may prompt the user for the due date and the system may recommend that the user to pay the bill on the due date and not before the due date. Additionally, if the user gets paid on the fifteenth of the month, the system recommends that the user pay himself first, leaving enough money to pay bills later, including the electric bill that is due on the first of the month. After the user pays himself, he can also budget discretionary money for entertainment purposes, dining out, etc. A responsible user is not likely to exceed his budget for discretionary money when he knows that bills are due that must be paid. Moreover, if the user exceeds the discretionary amount and cannot pay bills, then the user has already at least paid the most important entity first, namely himself.

In order for the user to meet a particular savings goal while the user continues to spend money, the system may be configured to transfer a certain amount of any user transaction amount to user savings account 23. In one embodiment, the user or system may set a particular dollar amount, percentage of purchase amount, number of transactions, total dollar amount spent or any other portion which is calculated based upon user transactions or the transaction amounts. For example, the system may obtain data from the user's transaction instrument account such that every time the user purchases an item which costs over $100, the system may transfer $5 of the user's income from user account 20 to the user savings account 23. In another example, the system may transfer 5% of the total value of all purchases during the next five months to user savings account 23. In these embodiments, the more a user spends on purchases, the more the user may save. Similarly, the system may analyze loyalty point accumulation and transfer loyalty points to a savings account based upon a pre-determined formula.

With respect to loyalty points, the system may incorporate loyalty points into any part of the process and provide the loyalty points to one or more participants in the process (e.g., user, payee, income source). As used herein, loyalty points may include any incentive which may or may not include points such as, for example, coupons, rewards, preferential services, preferential rates, prizes, vacations, entertainment packages and/or the like. In one embodiment, the system may provide loyalty points for every dollar that the user saves in savings account 23. The system may also encourage savings and discourage full payment of bills by providing loyalty points for not paying the full amount of a bill. The system may also provide a larger amount of loyalty points upon reaching a goal or upon reaching certain milestones toward the goal. The system may also provide extra loyalty points if the user allows the system to automatically transfer funds to savings account 23 without the user's prior approval. If user is utilizing the savings account to save money for a future gift or to provide a future donation to a charity, the system may allow the user to use loyalty points to pay for any portion of the gift or to supplement the charitable donation. The system may also acquire information related to user loyalty points (e.g., from system 1 (wherein the points were earned in system 1) or from a third party loyalty system), convert the loyalty points to a currency value and apply the currency value to user savings account 23 or payees 40 (e.g., user debts).

In still another embodiment, a government entity, an affiliate or sponsoring entity may provide loyalty points, preferred rates or rewards for increased savings. For example, user savings account 23 may be maintained at a bank such that the bank may desire to also encourage increased savings. In this regard, the bank may provide the user with loyalty points, higher interest rates, or prizes based upon the number of transfers or dollar amount of each transfer to the user savings account 23, the total amount in user savings account 23 during a certain time period and/or the like. For additional information related to loyalty systems, see for example, U.S. Ser. No. 10/010,947 entitled System And Method For Networked Loyalty Program which was filed on Nov. 6, 2001 and U.S. Ser. No. 09/834,478 entitled A System And Method For Using Loyalty Points which was filed on Apr. 13, 2001, which are hereby incorporated by reference.

While the present invention may be described as transferring funds to user savings account 23 first before other user debts, the invention also contemplates transferring funds to the user savings account 23 at any pre-determined time, interval or random period and the invention also contemplates transferring funds to the user savings account 23 before, during or after paying certain debts. For example, the system may allow the user to identify bills that are to be paid before the system transfers funds to the user savings account 23 and to identify bills to paid after the system transfers funds to the user savings account 23. The invention may also include exceptions to self payment first which may be determined by the user, a government entity or any other entity or person. The exceptions may include, for example, child support must always be paid first, then the user may decide on other "first" payment options. The invention may also allow the user to identify a priority for bills to be paid and/or any predetermined amount or percentage of each bill to pay.

During the overdraw analysis phase (step 215), prior to transferring the user income, host 5 may analyze the balance of funds in the user account 20 to determine if sufficient funds exist for paying the user savings account 23 and the bills according to the selected payment hierarchy. In one embodiment, because bills may vary from month to month, as the user enters bills to be paid, the program (e.g., in real-time) automatically performs a calculation to determine if the bills can be paid without overdrawing or exceeding the balance in the user account 20. If insufficient funds exist, system 1 may notify the user to readjust the payment hierarchy or the system may automatically adjust the payment hierarchy based upon pre-established rules. The system may notify the user of any overdraw issues via any communication system or network discussed herein.

During payment phase (step 220), if sufficient funds exist, system 1 transfers a predetermined amount of funds from user account 20 to user savings account 23, then to payees 40. In one embodiment, host 5 may transfer funds and/or payee information to automatic bill payment system 35 such that automatic bill payment system 35 allocates funds pursuant to pre-existing rules or auto bill pay procedures. Host 5 may provide instructions to automatic bill payment system 35 in such a way that automatic bill payment system 35 allocates consumer income to payees 40 according to the established hierarchy. For example, host 5 may provide automatic bill payment system 35 with the approval for payment of a bill for a necessity, then host 5 may wait until user savings account 23 reaches a pre-established level before providing another payment instruction to automatic bill payment system 35. In another embodiment, automatic bill payment system 35 may accept hierarchy or other instructions from system 1 and automatically allocate payments according to the hierarchy.

Transferring funds, or any similar phrase used herein, may include transferring all or any portion of funds, directly or indirectly, in any manner (e.g., electronic transfer, wire, etc). In one embodiment, the "transfer" may include, for example, encouraging the user to transfer funds, encouraging the user to select a particular transfer of funds by the system, providing a negotiable instrument (e.g., check) to the user (or to a selected person or entity), transferring funds to a charity or other entity (or dividing the funds between multiple charities), withdrawing funds from one account and depositing funds in another account, providing cash, transferring funds to any financial instrument discussed herein or known in the art (e.g., account, account number, stored value card, gift card, charge card credit, etc), sending the financial instrument to the user at predetermined intervals (e.g., monthly or when the account reaches a pre-determined amount), placing the selected funds in a pooled account with other family members (e.g., to save for a home improvement project), placing the selected funds in a pooled account with other friends (e.g., to save for a group vacation), and/or the like. The invention contemplates automatically receiving user income from income sources 30, automatically transferring funds to user and/or user savings account 23 and automatically transferring funds to payees 40; however, the invention also contemplates providing recommendations to user and allowing the user to obtain information, send information, or transfer the user's own funds manually or via a third party system.

The funds may be transferred periodically to user savings account 23, and in an embodiment, the user income may be periodically donated to a charity. For example, a donation to a charity may be represented by a savings amount that is set aside before analysis of debt obligations and, in an embodiment, a donation to a charity may be determined by the payment hierarchy. For more information and details related to periodic transfers, donation systems and methods, see for example, U.S. Ser. No. 10/707,715 filed on Jan. 6, 2004 by inventors Aviles et al. and entitled Donation System And Method, which is hereby incorporated by reference.

In one embodiment, funds may be transferred to a user savings account of a third party (e.g., charity) and/or a beneficiary (e.g., child). For example, a parent may set up a savings program for a child, so the system pays a child's account first. Thus, the parent is accomplishing a personal savings goal by ensuring that a child has sufficient funds for a future need (e.g., car, college, medical expenses, retirement, etc.). Similarly, the system can pay a charity or other entity first. In an embodiment, the payment hierarchy is determined based upon a charity amount, a plurality of pending debt payments, and a plurality of penalties.

In another embodiment, a stored value or gift card may be used to assist in the budgeting process and to meet the user goal. For example, the user may obtain an American Express Travel Funds Card that is automatically loaded by the system with the funds that user needs to pay bills. In an exemplary embodiment, the funds desired to meet the user's goal are first sent to a user savings account 23. After the user "pays himself" and the system receives the funds in the user savings account 23, the system may then take steps (or allow the user to take steps) to load or re-load the stored value card (i.e. the TravelFunds card).

In one embodiment, system 1 includes an empowerment engine that captures, compiles, arranges, organizes, learns from, uses and/or analyzes community knowledge. Community knowledge includes information (e.g., stored in a database) such as historical facts, experiences, user feedback, successful strategies, best practices, investment and savings rules, etc. For instance, in an embodiment, the empowerment engine aggregates a plurality of users' data (e.g., demographics, profile information, preferences, savings data, debt data, etc.), feedback, recommendations and/or results into community knowledge. Results may include a subjective assessment of the effectiveness of, for example, a payment hierarchy, a debt payment strategy or a penalty minimization strategy. Results may also include an objective assessment (e.g., by a standardized algorithm running on the empowerment engine) of an investment or savings strategy. In an embodiment, community knowledge comprises, for a plurality of users, savings strategies, transaction histories, demographics, merchant information, debtor information, debt history, debtors, timeframes, payment terms, payment histories, penalty histories, penalty amounts, penalty rules, debt obligations, savings goals, savings accomplishments, survey results and/or user recommendations.

In an embodiment, community knowledge is captured and compiled by the system's empowerment engine based upon ongoing usage such that community knowledge expands overtime. For example, a first user determines a savings amount based upon the first user's income and savings goals. Empowerment engine determines a payment hierarchy that prioritizes payment of debt obligations (e.g., bills) that directly affect the first user's credit score, while minimizing penalties (and/or fees) associated with not paying (or not fully paying) other debt obligations. Empowerment engine stores this data on system 1 (e.g., a database) and infers relationships (e.g., to other user data), creates rules and/or assesses the results of the effect of the payment hierarchy (e.g. on subsequent debt obligations). While entering a savings goal, the empowerment engine analyzes the community knowledge and creates one or more community recommendations for the second user. A user interface (e.g. a side bar of a web page, a pop-up window or other similar notification method) may present the second user with the community recommendation.

The empowerment engine may similarly access community knowledge during the creation and/or implementation of a payment hierarchy. System 1 creates an initial payment hierarchy for the second user and the empowerment engine analyzes community knowledge to identify similar users (e.g., similar demographic attributes) or situations (e.g. similar debts and/or payment terms). Empowerment engine may present (e.g., via system 1 user interface) one or more community recommendations to the second user and allow the user to select and implement community recommendations in order to fine tune the initial payment hierarchy. In an embodiment, system 1 is configured to provide a user interface that prompts the user to enter user savings goal information, the user to enter user debt information and/or user income information. A community recommendation may be general or specific. For example, a user may be presented with a message indicating that, based upon the guidelines of a non-profit savings foundation, users who limit going to restaurants to one nice restaurant visit per month typically save more than those who eat at cheaper establishments more often. Or, a user may be presented with a community recommendation regarding a refinancing opportunity based upon an analysis of users who have at least 31% equity in their home, have a mortgage with Chase Bank and have at least $2500 available to spend on closing costs.

As discussed, community knowledge is leveraged to provide useful information to users. However, one of skill in the art will recognize that community knowledge is beneficial outside the system as well. For example, system 1 may provide personal finance statistics to non-governmental and governmental organizations. In one embodiment, the data discussed herein, and/or the community knowledge may be used to form an alternate credit score for users. For example, an alternate credit score may reward (in the form of a higher score) savings activity and other positive behaviors, while at least partially disregarding or minimizing factors (such as pending debts or delayed payments) that may be considered negative by traditional credit scoring algorithms.

In an embodiment, system 1 is configured to determine a savings amount based at least partially upon the user credit information. System 1 analyzes user information to determine a credit score strategy and determines the payment hierarchy based upon a savings amount and the credit score strategy. In one embodiment, the payment hierarchy maximizes a credit score associated with the user. The various embodiments the credit score strategy may be based upon an alternate credit score, a traditional credit score or a combination of the two. The alternate credit score may be adjusted to account for the user savings amount. In an embodiment, a credit score strategy comprises forecasting a plurality of alternate credit score data based upon, for example, the user debt information, the savings amount, user savings history information, user debt payment timing information and/or user income information. System 1 is configured to obtain both general credit scoring information and user specific credit score information.

In one embodiment, system 1 is configured to determine a recommendation that is based upon improving a credit score. A traditional credit score may be influenced in ways that are counter intuitive to a typical user. For example, closing a credit card may seem to a typical user to be a positive step toward better credit but it may not be seen as such by traditional credit scoring algorithms. Thus, system 1 may suggest a credit score recommendation based upon the credit score information and present the credit score recommendation to the user. The user may enter an approval of the credit score recommendation and system 1 determines the credit score strategy based upon the credit score recommendation. The payment hierarchy may be based upon the credit score strategy (e.g., payment hierarchy may recommend not paying off the debt associated with a credit card or may recommend paying only a minimum amount).

In one embodiment, community knowledge includes more than data. As previously discussed, the empowerment engine develops and evolves community knowledge through automated learning. As such, the empowerment engine of system 1 may be configured to analyze the community knowledge data, create rules, develop relationships and/or generate new data, based upon predetermined rules and/or algorithms. Empowerment engine may be configured to execute deductive logic, inferential analysis, forecasting, statistical analysis and/or artificial intelligence in order to continually develop the effectiveness and relevance of community knowledge. In an embodiment, empowerment engine includes a database of user experiences, a knowledge base and/or an expert system. The community recommendation may be updated, changed or supplemented based on such evolution of community knowledge. In that regard, the community recommendation display may include community recommendation trends, changes, historical information and/or the like.

In one embodiment, community knowledge and the empowerment engine are parts of a knowledge based system. As one of skill in the art will recognize, a knowledge based system may comprise an artificial intelligence tool working to provide intelligent decisions with justification. Knowledge is acquired and represented using various knowledge representation techniques rules, frames and scripts. Exemplary advantages offered by such systems are documentation of knowledge (e.g., the collective knowledge of what payment strategies have helped to minimize penalties), intelligent decision support, self learning, reasoning and explanation. A machine-readable knowledge base stores knowledge in a computer-readable form; e.g., for the purpose of having automated deductive reasoning applied to the data. In an embodiment, system 1 includes a set of data and rules that describe aggregate experience or community knowledge in a logically consistent manner. An ontology defines the structure of stored data (e.g., what types of entities are recorded and what their relationships are) and classical deduction is used to reason about the knowledge in the knowledge base. In one embodiment, community knowledge is a machine-readable knowledge base used with an artificial intelligence function of system 1, for example, as part of an expert system that focuses on a domain, such as financial planning. For more information regarding knowledge based systems, see "Knowledge-based systems," by Akerkar R A and Sajja Priti Srinivas, Jones & Bartlett Publishers, Sudbury, Mass., USA (2009), which is hereby incorporated by reference in its entirety.

In an embodiment, system 1 is a computer-based system for determining a savings amount and a payment hierarchy configured to receive user financial information that may include user savings goal information, user debt information and user income information. The computer-based system determines the savings amount based upon the user savings goal information and the user income information. In an embodiment, the savings amount is at least a portion of user income. The savings amount is transferred to a user savings account. In various embodiments, the transfer of any portion of the savings amount may be accomplished by system 1, a bill payment system, a user, a third-party, a financial institution and/or the like. The computer-based system is further configured to analyze the user debt information to determine a plurality of pending debt payments. In one embodiment, the computer-based system determines the plurality of debt obligations in response to the transfer of the savings amount. The computer-based system determines a plurality of penalties by analyzing a penalty for each of the plurality of pending debt payments. The computer-based system determines a community recommendation based upon community knowledge. In an embodiment, the community recommendation may be further based upon the user debt information, the plurality of debt payments, the user income information, the user savings goal information, and/or the plurality of penalties. The computer-based system determines the payment hierarchy based upon the savings amount, the plurality of penalties and the community recommendation. In an embodiment, the payment hierarchy minimizes the plurality of penalties.

As discussed above, the computer-based system is configured (e.g., via an empowerment engine), in one embodiment, to expand and enhance the community knowledge by automated learning. For example, data such as user demographics, user preferences, the savings amount, the plurality of penalties, the payment hierarchy, the community recommendation, the user income information, and/or the user savings goal information may be analyzed, categorized, processed by statistical and/or probabilistic models, summarized, aggregated and/or related to other data in order to contribute to the learning. In one embodiment, community knowledge includes, for example, transaction information received from an issuer, a payment processor, a merchant, a bill payment system, a third-party data provider and/or a service provider associated with a debt obligation. In an embodiment, the computer-based system is configured to update a rule associated with the community knowledge based upon a demographic and the payment hierarchy.

The collective experience and wisdom aggregated into community knowledge is used, in one embodiment, to determine a community recommendation regarding a savings amount. In an embodiment, the community recommendation may be selected automatically or may be selected by the user from a plurality of community recommendations generated from the community knowledge. For example, during a savings goal input process, the user may be presented with sidebar information (e.g., separate from but seamlessly integrated with the main data input interface) that presents a plurality of community recommendations to the user. The user may select a community recommendation and be presented with forecasts or models that predict how the recommendation may influence the user's savings, payments, debts, etc. For example, the community recommendation may include a recommendation, partially or fully developed from previous user actions and the results they experience from those actions, associated with the payment amount and/or a recommendation associated with the payment timing. In various embodiments, community recommendations include recommendations based upon a savings strategy, a debtor, a type of debt, a type of user, a type of penalty and/or a plurality of penalty types.

As one of skill in the art may recognize, the data, rules, results, interrelationships and dimensions of factors aggregated from multiple users across a potentially broad spectrum of financial situations produces rich opportunities to take advantage of community knowledge and to benefit individual users. Additionally, in an embodiment, the volume and complexity associated with such a knowledge base benefits from special use computers with hardware and/or software configured, as discussed above, to expand, enhance and leverage the data. In an embodiment, community knowledge is provided by a third-party such as for example, a service provider, a government entity or a non-profit organization.

In an embodiment, system 1 includes social networking features. For example, a user finds (e.g., via a search mechanism) other users and connects with the other users to form associations, networks, sub-networks. For example, a user may search for a group of friends, family members, financial advisors, etc. in order to share data, experiences and/or accomplishments with the network as disclosed herein. The social networking features include sending messages, receiving messages, updating a status, designating the type and amount of data that may be shared with a network, etc.

In one embodiment, system 1 integrates and/or interfaces with other social networking systems such as Facebook, Twitter, LinkedIn, etc. The systems may share users, data, events and functionality. For example, in one embodiment, a user pledges a series of contributions (e.g., monthly contribution for a year) to a charity on Facebook and system 1 obtains the pledge information and stores it as a debt obligation. In a similar example, a user on system 1 achieves a savings goal and system 1 causes the user's Facebook status to reflect the achievement. Furthermore, community knowledge is enhanced, in one embodiment, with the knowledge shared from other social networking systems. For example, a survey of successful savings techniques may be conducted on Facebook and system 1 may obtain the survey results, analyze the results and update community knowledge with rules and/or recommendations.

In one embodiment, the system is configured to associate social network information with a personalized financial advice network of a user. The system analyzes the social network information and user information to determine personal finance rules for the personalized financial advice network. The user information may include, for example, of user goal information, user income information and user debt information, and wherein the user information is associated with the user. The system determines a savings amount based upon the personal finance rules and other information such as user goal information and user income information. The system is also configured to send at least a portion of user information to the social network. For example, the system may update a status associated with a social network account of the user and the status may be associated with at least one of the user goal information, the savings amount, the transfer of the savings amount and the personal finance rules. In an embodiment, the system receives a message from the social networking website and parsing the message to determine a personal finance rule.

In one embodiment, the system is further configured to send user information to the social network and the social network performs a search of the social network based the user information. The search identifies a social network member and a social network group that matches the user information, thus identifying one or more entities that may be included in a personalized financial network for the user. The system is configured to request information from the social network and to receive an approval from the social network to use or include member information in constructing personalized financial advice network of the user. The personalized financial advice network may include, for example, a member, a plurality of members of the social network, groups, relatives, financial professionals, common interest groups, clubs and subsets of groups. The system may also receive a personal finance suggestion from the user and send the personal finance suggestion to the social network.

In an embodiment, the system may automatically determine (e.g., based upon an occurrence of an event) that a user goal has been accomplished and send a message to the social network that the user goal has been accomplished. In an embodiment, the user may receive a charity request from the social network, notify the user of the charity request and receive an approval from the user to make a donation to the charity. The system is also configured to determine a donation amount and to add the donation amount as a pending debt payment in the plurality of pending debt payments.

As disclosed herein, user may interact with system 1 via various interfaces and devices. In one embodiment, user accesses the functionality of system 1 via a mobile device (e.g., a mobile phone). Any of the goal setting, paying yourself first, funds transfer, financial account review and maintenance, payment hierarchy, community recommendation, bill payment functionality and/or any other functions disclosed herein may be accessed (and exchange data with) via a mobile device. For example, user may use a UPC reader function on a mobile phone to read a UPC of a product and upload the product information to system 1 to indicate a savings goal (e.g., save enough money to purchase a particular television). Furthermore, system 1 may push notifications to a mobile device to indicate that a new bill has been received, to communicate a savings tip (i.e., a community recommendation) or to report progress toward a savings goal.

In an embodiment, system 1 is configured to produce a wide variety of output (reports, graphs, notifications, etc). The output may be produced automatically, for example, based on a schedule or triggered by an event, or output may be produced upon request of a user and/or interfacing system. In an embodiment, system 1 downloads and categorizes account balances and/or transactions automatically every day. Thus, upon receiving the updated data, system 1 may send reports and/or graphs of user spending, income, balances, and net worth.

In an embodiment, a user account is associated with a transaction account and/or instrument. A transaction instrument may include a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. In one embodiment, the system may receive transaction information for a transaction account and determine a savings amount based upon the transaction information.

In an embodiment, system 1 may be owned and/or operated by the financial institution (e.g., bank) that issues the transaction account such that system 1 may access transaction information that may not be available from other sources (e.g., a transaction request that was denied). Thus, system 1 may use the data to enhance the community knowledge and provide relevant and insightful recommendations to the user. Furthermore, data may be shared with marketing partners or merchants in order to provide a revenue source for the issuing bank, payment processor and/or other entities. Additionally, use of system 1 is encouraged and increased since, for example, the transaction account provides additional customer service opportunities, i.e., touch points or opportunities to connect with the customers who are also system 1 users.

Such touch points are beneficial to the user since, via these customer service interactions, the user may receive additional encouragement and/or incentive to save. For example, a customer may receive a discount on a bill if the bill is paid using system 1 bill payment features. In an embodiment, the discount may be directly deposited to a user savings account. Furthermore, a user with a transaction instrument may benefit from merchant programs. For example, a merchant may provide a payment to the user savings account based upon a particular purchase and/or achieving a threshold amount of spending. Moreover, in an embodiment, a merchant may be notified that the user has achieved a savings goal and provide the user with a reward (e.g., a discount on the item that the user was saving to purchase).

The merchant may also provide a layaway program that integrates with a user savings goal. For instance, a user enters a savings goal to purchase a new dishwasher and the merchant guarantees the price and receives reports from system 1 of progress by the user toward the savings goal. In an embodiment, the system includes receiving layaway information for a layaway transaction and determining, by the computer-based system, a layaway amount based upon the layaway information. The layaway amount is transferred (for example, by the system) from a user account. The system determines a payment hierarchy based upon the layaway amount, a plurality of pending debt payments, and a plurality of penalties. In an embodiment, the payment hierarchy is optimized to minimize the plurality of penalties. The layaway information may include a product, a purchaser, and a merchant. The layaway amount may be, for example, transferred to a merchant or to a user savings account. In an embodiment the merchant or a product manufacturer, in response to the layaway amount being transferred, provides a reward (e.g. a discount, loyalty points, etc) to the user.

In an embodiment, the system determines the layaway amount based upon a savings amount. For instance, a predetermined rule may indicate that a payment for a layaway item (which may, for example, represent a luxury item for the user) should only be paid when money is first dedicated toward a savings goal. In an embodiment, determining the payment hierarchy is based upon the savings amount, the plurality of pending debt payments, and the plurality of penalties and determining the layaway amount is performed in response to determining the payment hierarchy.

In an embodiment, system 1 not only aids in optimizing user savings and minimizing penalties associated with user debts, but also identifies opportunities for the user to earn additional income. A revenue producing opportunity may involve, for example, an opportunity for the user to become a franchisee, a sales representative, a retailer, commissioned agent, and/or an incentive associated with reducing user debt or achieving a user savings goal. The system matches a revenue producing opportunity with information about the user. In an embodiment, the system determines the revenue producing opportunity by matching a product associated with the revenue producing opportunity with an interest, an education, an income level, an income source, a debt level and a goal of the user.

In an embodiment, system 1 is further configured to track actions performed or initiated by the user that may allow the user to earn and collect new income. For example, the user may refer a friend to a product website or may directly sell a product. System 1 tracks this data and provides it to the entity that offered the revenue producing opportunity. In one embodiment, the entity pays the user, via the system, and the entity transfers the new income directly to a savings account of the user. The entity may also provide system 1 with data regarding the new income earned by the user. In an embodiment, if the new income is less than a predetermined savings amount, the system automatically transfers money from a user account to a savings account of the user.

In an embodiment, a new income opportunity is received from a social network based upon social network information such as, for example, a friend associated with the user, a group associated with the user, user profile information, user photographs, user videos and user status information, wherein the user is a member of the social network.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, when a phrase similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C. Although the invention has been described as a method, it is contemplated that it may be embodied as computer program instructions on a tangible computer-readable medium or carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A method comprising:
   receiving, by a computer system associated with a financial institution, transaction information indicating a denied transaction request, wherein the denied transaction request is associated with an account of a user at the financial institution;
   determining, by the computer system, a savings amount based upon the transaction information that indicates the denied transaction request, wherein the savings amount is for transfer to a savings account of a user associated with the transaction account at the financial institution;
   determining, by the computer system, a plurality of pending debt payments corresponding to a plurality of debts associated with the user;
   determining, by the computer system, a plurality of penalties corresponding to the plurality of pending debt payments; and
   determining, by the computer system, a payment hierarchy based upon the savings amount, the plurality of pending debt payments, and the plurality of penalties, wherein the payment hierarchy specifies payment amounts for the plurality of debts associated with the user and minimizes a total cost of the plurality of penalties.

2. The method of claim 1, wherein the savings amount is based upon a predetermined rule associated with the transaction account.

3. The method of claim 1, wherein the savings amount is a fixed percentage of a first transaction amount associated with a first transaction, wherein data for the first transaction is included in the transaction information.

4. The method of claim 1, wherein the computer system is configured to determine a different savings amount in the absence of receiving the transaction information indicating the denied transaction request.

5. The method of claim 1, further comprising determining a donation amount based upon a charity pledge.

6. The method of claim 5, further comprising receiving charity pledge information from a social networking system.

7. The method of claim 1, wherein transferring the savings amount comprises transferring the savings amount to an investment account of a third-party.

8. The method of claim 1, wherein the information indicating the denied transaction request is unavailable from a source other than the financial institution.

9. The method of claim 1, wherein the financial institution is a bank.

10. The method of claim 1, wherein determining the savings amount is based upon community knowledge associated with financial transaction account spending and savings rates.

11. The method of claim 10, wherein the community knowledge comprises, for a plurality of users, at least one of savings strategies, transaction histories, demographics, merchant information, debtor information, debt history, debtors, timeframes, payment terms, payment histories, penalty histories, penalty amounts, penalty rules, debt obligations, savings goals, savings accomplishments, survey results and user recommendations.

12. The method of claim 1, wherein the payment hierarchy is further based upon the transaction information.

13. The method of claim 1, wherein the savings amount is transferred, by the computer system, by debiting the financial transaction account.

14. A non-transitory computer-readable medium having computer executable instructions stored thereon that, if executed by a computer system associated with a financial institution, cause the computer system to perform operations comprising:
   receiving transaction information indicating a denied transaction request, wherein the denied transaction request is associated with an account of a user at the financial institution;
   determining a savings amount based upon the transaction information that indicates the denied transaction request, wherein the savings amount is for transfer to a savings account of a user associated with the transaction account at the financial institution;
   determining a plurality of pending debt payments corresponding to a plurality of debts associated with the user;
   determining a plurality of penalties corresponding to the plurality of pending debt payments; and
   determining a payment hierarchy based upon the savings amount, the plurality of pending debt payments, and the plurality of penalties, wherein the payment hierarchy specifies payment amounts for the plurality of debts associated with the user and minimizes a total cost of the plurality of penalties.

15. The non-transitory computer-readable medium of claim 14, wherein the financial institution is a bank.

16. The non-transitory computer-readable medium of claim 14, wherein the information indicating the denied transaction is unavailable from a source other than the financial institution.

17. The non-transitory computer-readable medium of claim 14, wherein the information indicating the denied transaction specifies an amount of a transaction that was denied.

18. The non-transitory computer-readable medium of claim 17, wherein the operations further comprise determining the savings amount based upon the amount of the transaction that was denied.

* * * * *